(12) United States Patent
Ogi et al.

(10) Patent No.: US 12,544,024 B2
(45) Date of Patent: Feb. 10, 2026

(54) RADIATION IRRADIATION DEVICE

(71) Applicant: FUJIFILM Corporation, Tokyo (JP)

(72) Inventors: Kazuyuki Ogi, Kanagawa (JP); Takeyasu Kobayashi, Kanagawa (JP); Naoyuki Nishino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 174 days.

(21) Appl. No.: 18/544,252

(22) Filed: Dec. 18, 2023

(65) Prior Publication Data
US 2024/0206832 A1 Jun. 27, 2024

(30) Foreign Application Priority Data

Dec. 27, 2022 (JP) ................................ 2022-210694

(51) Int. Cl.
*A61B 6/00* (2024.01)
*A61B 6/40* (2024.01)

(52) U.S. Cl.
CPC .............. *A61B 6/4405* (2013.01); *A61B 6/40* (2013.01); *A61B 6/547* (2013.01); *A61B 6/56* (2013.01)

(58) Field of Classification Search
CPC .................................................... A61B 6/4405
See application file for complete search history.

(56) References Cited

U.S. PATENT DOCUMENTS

| | | | |
|---|---|---|---|
| 2016/0174915 A1* | 6/2016 | O'Dea | A61B 6/547 378/198 |
| 2018/0301235 A1 | 10/2018 | Kawahara et al. | |
| 2019/0380664 A1 | 12/2019 | Nariyuki et al. | |

FOREIGN PATENT DOCUMENTS

JP 2018-175348 A 11/2018

OTHER PUBLICATIONS

The extended European search report issued by the European Patent Office on Feb. 12, 2024, which corresponds to European Patent Application No. 23217240.3-1126 and is related to U.S. Appl. No. 18/544,252.

* cited by examiner

*Primary Examiner* — Dani Fox
(74) *Attorney, Agent, or Firm* — Studebaker Brackett PLLC

(57) ABSTRACT

A radiation irradiation device includes: a device main body that irradiates a subject with radiation; a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion; and a processor, in which the processor detects a state including the storage state and the unfolded state of the spacing ensuring unit, and executes a control of an operation of the device main body according to the detected state.

9 Claims, 18 Drawing Sheets

FIG. 6
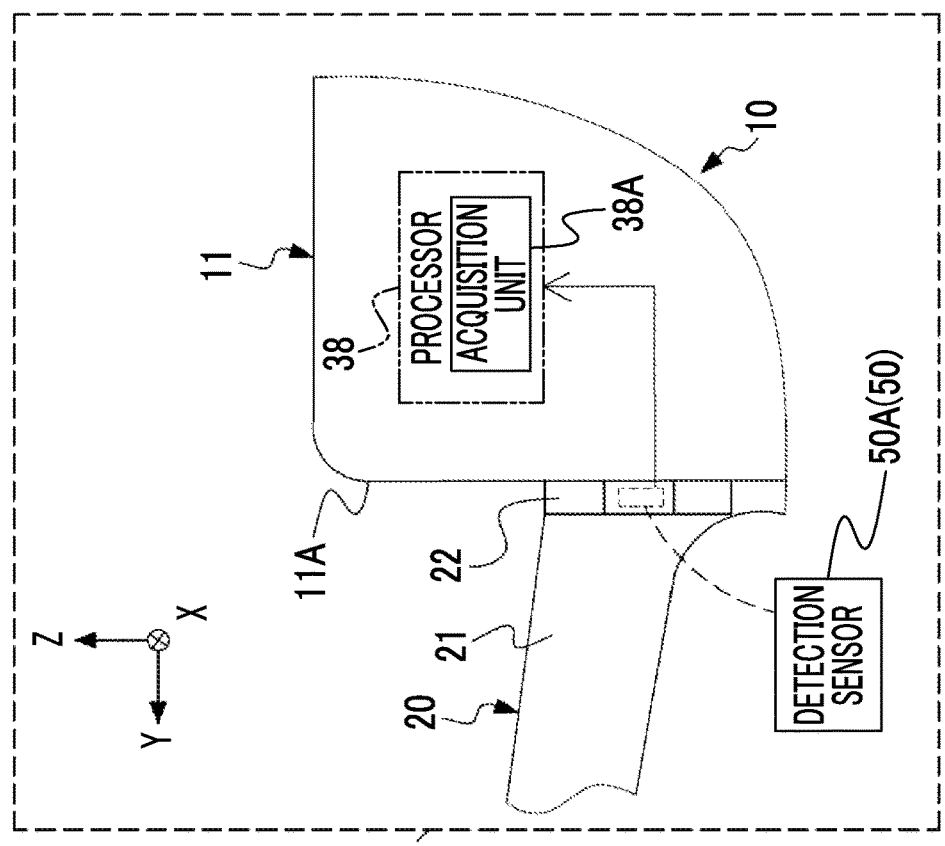
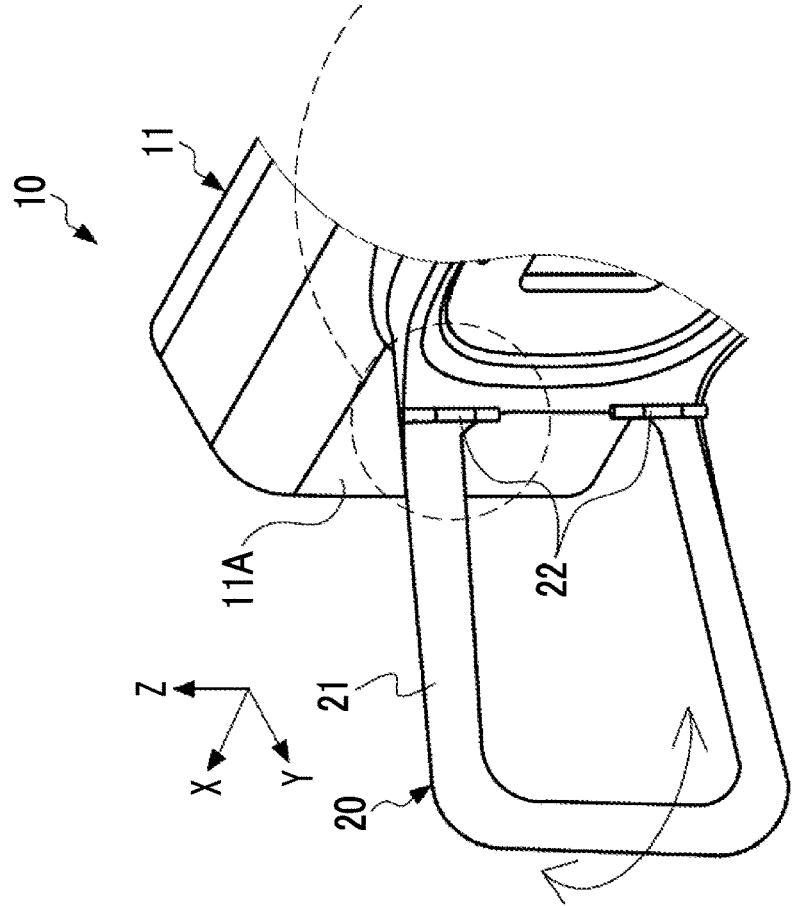

FIG. 9
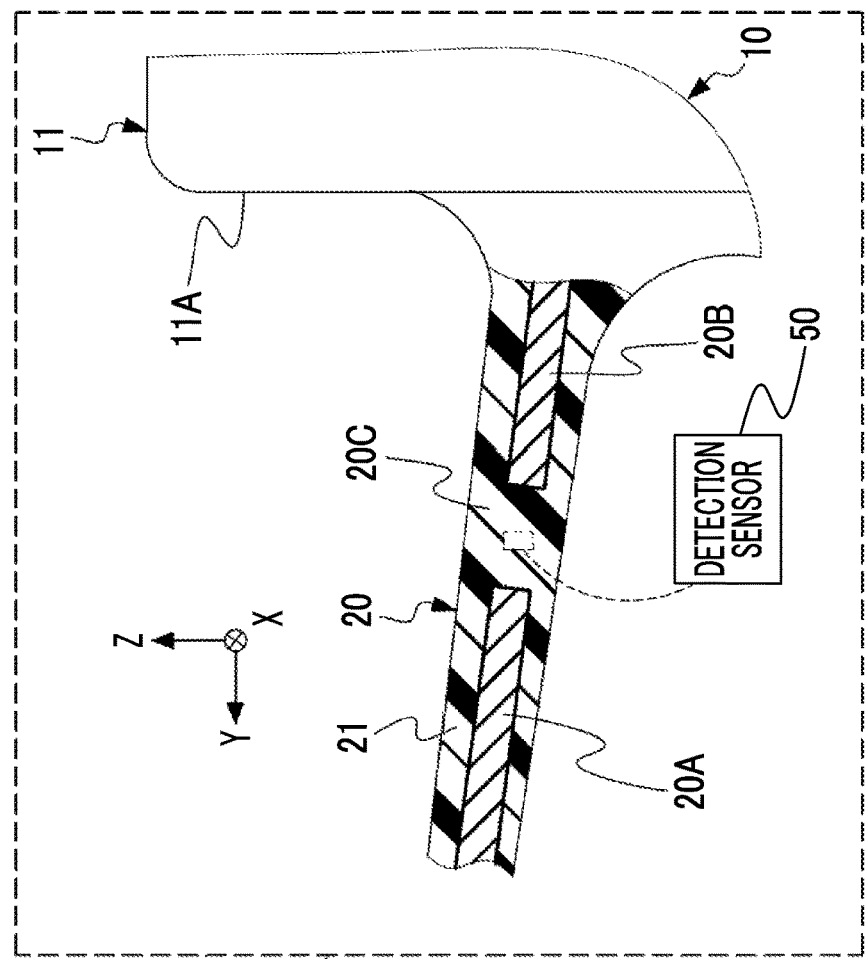
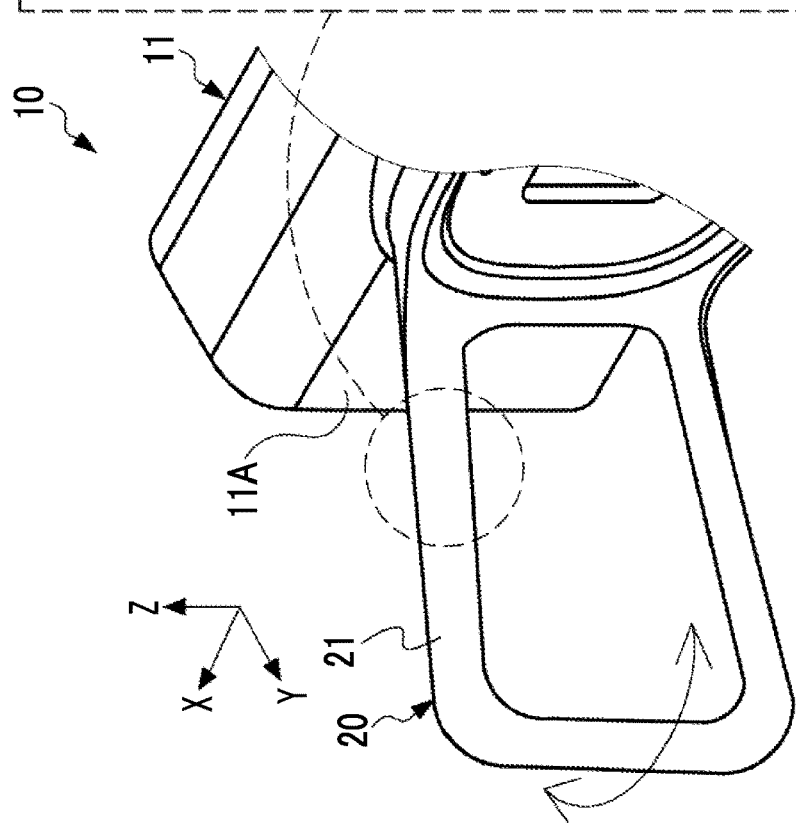

RADIATION IRRADIATION DEVICE

CROSS-REFERENCE TO RELATED APPLICATION

This application claims priority from Japanese Patent Application No. 2022-210694, filed Dec. 27, 2022, the disclosure of which is incorporated herein by reference in its entirety.

BACKGROUND

Technical Field

The present disclosure relates to a radiation irradiation device.

Related Art

JP2018-175348A discloses a radiation irradiation device comprising a radiation generation unit that generates radiation, a collimator unit that controls an irradiation range of the radiation generated in the radiation generation unit, and a spacing ensuring unit having an abutment member that abuts on a subject to be irradiated with the radiation, in a case where the radiation generation unit and the subject are closer than a preset distance, and ensuring a spacing between the radiation generation unit and the subject.

JP2018-175348A discloses that the abutment member of the spacing ensuring unit is configured to be foldable. It is possible to improve storability and portability by folding the abutment member.

In this radiation irradiation device, it may be necessary for a user to perform work of checking a state of the spacing ensuring unit. For example, it is necessary to check that the spacing ensuring unit is unfolded before performing irradiation with the radiation. However, in handling the radiation irradiation device, the work of the user depending on the state of the spacing ensuring unit is a burden on the user.

SUMMARY

The technology of the present disclosure provides a radiation irradiation device that can reduce the need to perform work depending on the state of the spacing ensuring unit and improve convenience.

A first aspect according to the technology of the present disclosure is a radiation irradiation device comprising: a device main body that irradiates a subject with radiation; a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion; and a processor, in which the processor detects a state including the storage state and the unfolded state of the spacing ensuring unit, and executes a control of an operation of the device main body according to the detected state.

A second aspect of the technology of the present disclosure is the radiation irradiation device according to the first aspect of the technology of the present disclosure, in which in a case where an irradiation start instruction which is an instruction to start irradiation with the radiation is input, the processor executes, as the control, an irradiation control which is a control related to the irradiation.

A third aspect of the technology of the present disclosure is the radiation irradiation device according to the second aspect of the technology of the present disclosure, in which the irradiation control includes prohibiting the irradiation with the radiation by the device main body or notifying whether or not the irradiation with the radiation is allowed in a case where the spacing ensuring unit is in the storage state.

A fourth aspect of the technology of the present disclosure is the radiation irradiation device according to the second aspect of the technology of the present disclosure, in which the irradiation control includes permitting the irradiation with the radiation by the device main body in a case where the spacing ensuring unit is in the unfolded state.

A fifth aspect of the technology of the present disclosure is the radiation irradiation device according to the first aspect of the technology of the present disclosure, in which the control includes starting preparation for irradiation with the radiation in a case where the spacing ensuring unit is brought into the unfolded state.

A sixth aspect of the technology of the present disclosure is the radiation irradiation device according to the first aspect of the technology of the present disclosure, in which the control includes releasing at least a part of functions of the device main body, which are stopped in the storage state, in a case where the spacing ensuring unit is brought into the unfolded state.

A seventh aspect of the technology of the present disclosure is the radiation irradiation device according to the sixth aspect of the technology of the present disclosure, in which the functions of the device main body, which are stopped in the storage state, include a function of performing irradiation with the radiation, and the function of performing irradiation with the radiation remains stopped while an additional operation is not performed even in a case where the spacing ensuring unit is brought into the unfolded state.

An eighth aspect of the technology of the present disclosure is the radiation irradiation device according to the first aspect of the technology of the present disclosure, in which the device main body includes a notification unit that gives a notification to a user, and the control includes causing the notification unit to give a notification regarding the state.

A ninth aspect of the technology of the present disclosure is the radiation irradiation device according to the first aspect of the technology of the present disclosure, in which in a case where a power supply of the device main body is turned off, the power supply of the device main body is turned on in a case where the spacing ensuring unit is brought into the unfolded state.

A tenth aspect of the technology of the present disclosure is the radiation irradiation device according to the first aspect of the technology of the present disclosure, in which the device main body is provided with a first sensor capable of detecting a distance between the movable portion and the device main body in each of the storage state and the unfolded state, and the processor detects the state of the spacing ensuring unit according to an output from the first sensor.

An eleventh aspect of the technology of the present disclosure is the radiation irradiation device according to the first aspect of the technology of the present disclosure, in which the spacing ensuring unit is provided with a second sensor capable of detecting a displacement of the movable portion, and the processor detects the state of the spacing ensuring unit according to an output from the second sensor.

A twelfth aspect of the technology of the present disclosure is the radiation irradiation device according to the first aspect of the technology of the present disclosure, in which the device main body includes an optical imaging device capable of imaging the subject, and the processor detects the state of the spacing ensuring unit by executing image recognition processing on an image obtained by imaging the movable portion with the optical imaging device.

The technology of the present disclosure provides a radiation irradiation device that can reduce the need to perform work depending on the state of the spacing ensuring unit and improve convenience.

BRIEF DESCRIPTION OF THE DRAWINGS

FIG. 6 is a conceptual diagram showing an example of an aspect of an output of a signal corresponding to a state of a spacing ensuring unit by a detection sensor.

FIG. 9 is a conceptual diagram showing an example of an aspect of an output of a signal corresponding to a state of the spacing ensuring unit by the detection sensor.

DETAILED DESCRIPTION

Hereinafter, an embodiment of the present disclosure will be described in detail with reference to the drawings.

In the following description, for convenience of explanation, a height direction, a width direction, and a front-rear direction (also referred to as a depth direction) of a radiation irradiation device 10 are indicated by three arrows X, Y, and Z. First, the height direction is indicated by the arrow Z, an arrow Z direction pointed by the arrow Z is an upward direction of the radiation irradiation device 10, and an opposite direction of the upward direction is a downward direction. The height direction is a vertical direction. The width direction is indicated by the arrow X orthogonal to the arrow Z, a direction pointed by the arrow X is a right direction of the radiation irradiation device 10, and an opposite direction of the right direction is a left direction. The front-rear direction is indicated by the arrow Y orthogonal to the arrow Z and the arrow X, a direction pointed by the arrow Y is a front direction of the radiation irradiation device 10, and an opposite direction of the front direction is a rear direction. That is, in the radiation irradiation device 10, an emission direction of the radiation is the front direction, and a side on which a subject A stands (see FIG. 1) is the front direction. In addition, in the following, expressions using sides such as an upper side, a lower side, a left side, a right side, a front side, and a rear side have the same meanings as the expressions using the directions.

In the present embodiment, a "vertical direction" refers not only to a perfect vertical direction but also to a vertical direction in the sense of including an error that is generally acceptable in the technical field to which the technology of the present disclosure belongs and that does not contradict the concept of the technology of the present disclosure. The same applies to a "horizontal direction". The "horizontal direction" refers not only to a perfect horizontal direction but also to a horizontal direction in the sense of including an error that is generally acceptable in the technical field to which the technology of the present disclosure belongs and that does not contradict the concept of the technology of the present disclosure.

First Embodiment

Figure 1:
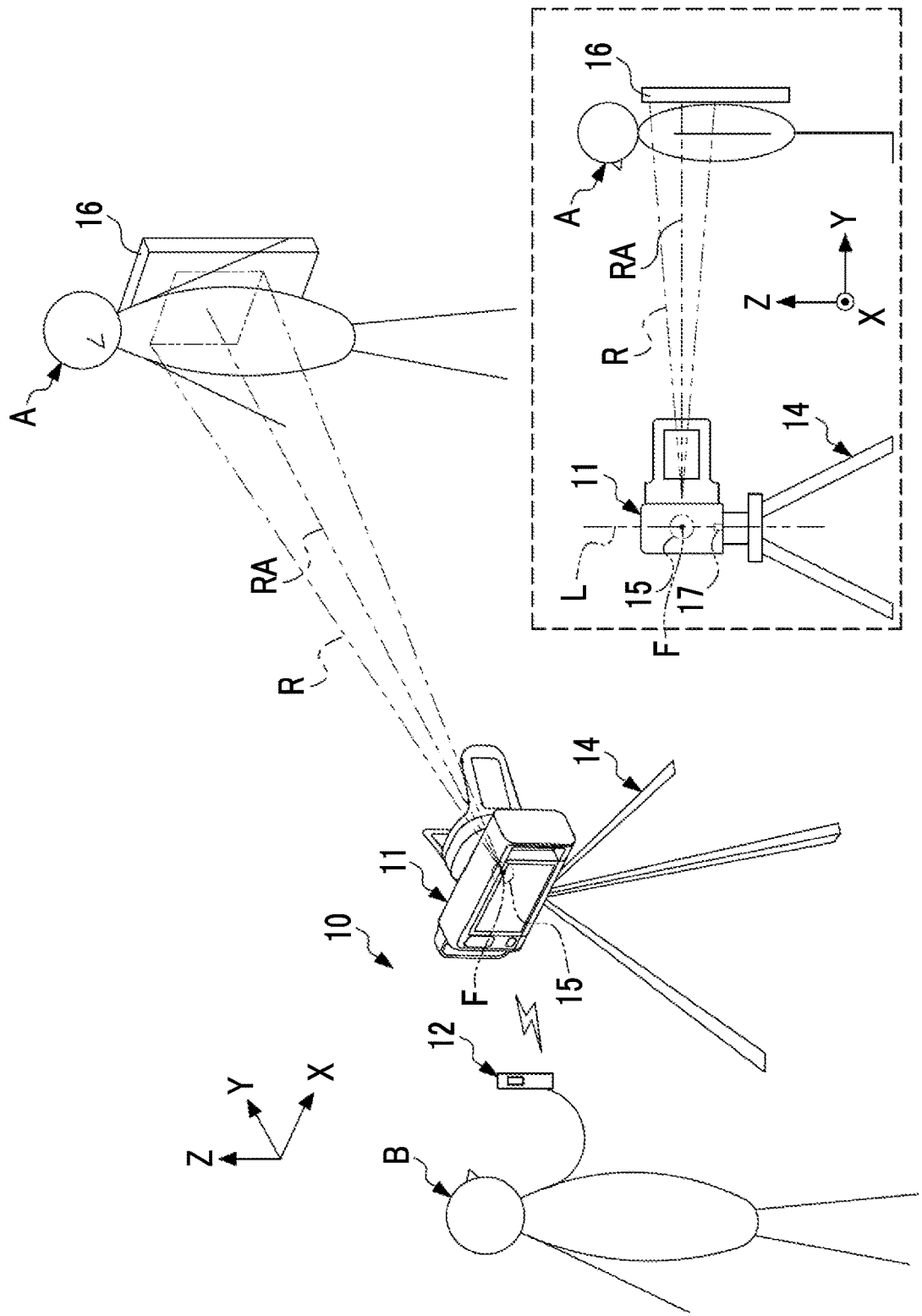
FIG. 1 is a perspective view showing an example of a usage state of a radiation irradiation device.

As shown in FIG. 1 as an example, the radiation irradiation device 10 comprises a device main body 11 and a remote operation unit 12. The device main body 11 is a device that can irradiate the subject A with radiation R. The device main body 11 comprises a radiation tube 15, which is a generation source of the radiation, inside thereof and emits the radiation (for example, X-rays or γ-rays) generated in the radiation tube 15 toward the subject A via an irradiation field limiter (see FIG. 3), an irradiation window (see FIG. 3), and the like. The radiation irradiation device 10 is an example of a "radiation irradiation device" according to the technology of the present disclosure, and the device main body 11 is an example of a "device main body" according to the technology of the present disclosure. Here, the term "remote" means separation to the extent caused by physical separation, and does not mean an amount of distance.

The radiation irradiation device 10 has a portable size and weight. That is, the radiation irradiation device 10 is a portable radiation irradiation device. The radiation irradiation device 10 may be used, for example, in a simple radiographic examination at a medical facility or may be used in a radiographic examination during home medical care. In addition, the radiation irradiation device 10 may be used outdoors. For example, the radiation irradiation device 10 may be used for an on-site medical care in a disaster-stricken area or a medically underserved area.

The device main body 11 is set at a predetermined position (for example, height and distance) with respect to the subject A via, for example, a tripod 14. A fixing portion 17 for fixing the tripod 14 and the device main body 11 is provided on a lower surface of the device main body 11. The fixing portion 17 is, for example, a screw hole. The fixing portion 17 is located on a straight line L which is orthogonal to a central axis RA of a flux of the radiation R and passes through a focus F of the radiation tube 15. The radiation tube 15 generates the radiation R, for example, by colliding electrons emitted from a cathode with a target. The focus F is a position where the electrons collide on the target. The flux of the radiation R spreads in a conical shape with the focus F as a base point. The central axis RA is a central axis of such a flux. The fixing portion 17 is provided at a position where the straight line L and the lower surface of the device main body 11 intersect. In the radiation irradiation device 10, a portion in which the focus F of the radiation tube 15 is located is close to a centroid. The fixing portion 17 is provided on the straight line L, which makes it easy to stabilize the radiation irradiation device 10 on the tripod 14.

The remote operation unit 12 is a device that can remotely operate the device main body 11. The remote operation unit 12 is attachable to and detachable from the device main body 11. The remote operation unit 12 remotely operates the device main body 11, for example, by performing wireless communication with the device main body 11. The remote operation by the remote operation unit 12 includes, for example, an operation of causing the device main body 11 to emit the radiation R toward the subject A.

A user B, who is an operator of the radiation irradiation device 10, takes out the remote operation unit 12 from the device main body 11 and then operates the remote operation unit 12 in a state of being separated from the device main body 11 by a predetermined distance. As a result, the radiation R is emitted from the radiation tube 15 of the device main body 11 to the subject A. The radiation R transmitted through the subject A is detected by a detector 16. The detector 16 is, for example, a so-called flat panel detector, has a detection surface on which pixels are two-dimensionally arranged, and outputs an image signal corresponding to an intensity of the radiation R incident on each pixel. The radiation R is transmitted through the subject A to carry information regarding a body tissue of the subject A. The detector 16 detects the radiation R in each pixel of the detection surface to output an image signal representing a projection image of the body tissue of the subject A as a radiation image.

Further, the user B accommodates the remote operation unit 12 in the device main body 11 after completing imaging using the radiation irradiation device 10. In a state in which the remote operation unit 12 is accommodated in the device main body 11, the radiation irradiation device 10 is carried by the user B or is stored in a storage case of the radiation irradiation device 10.

Figure 2:
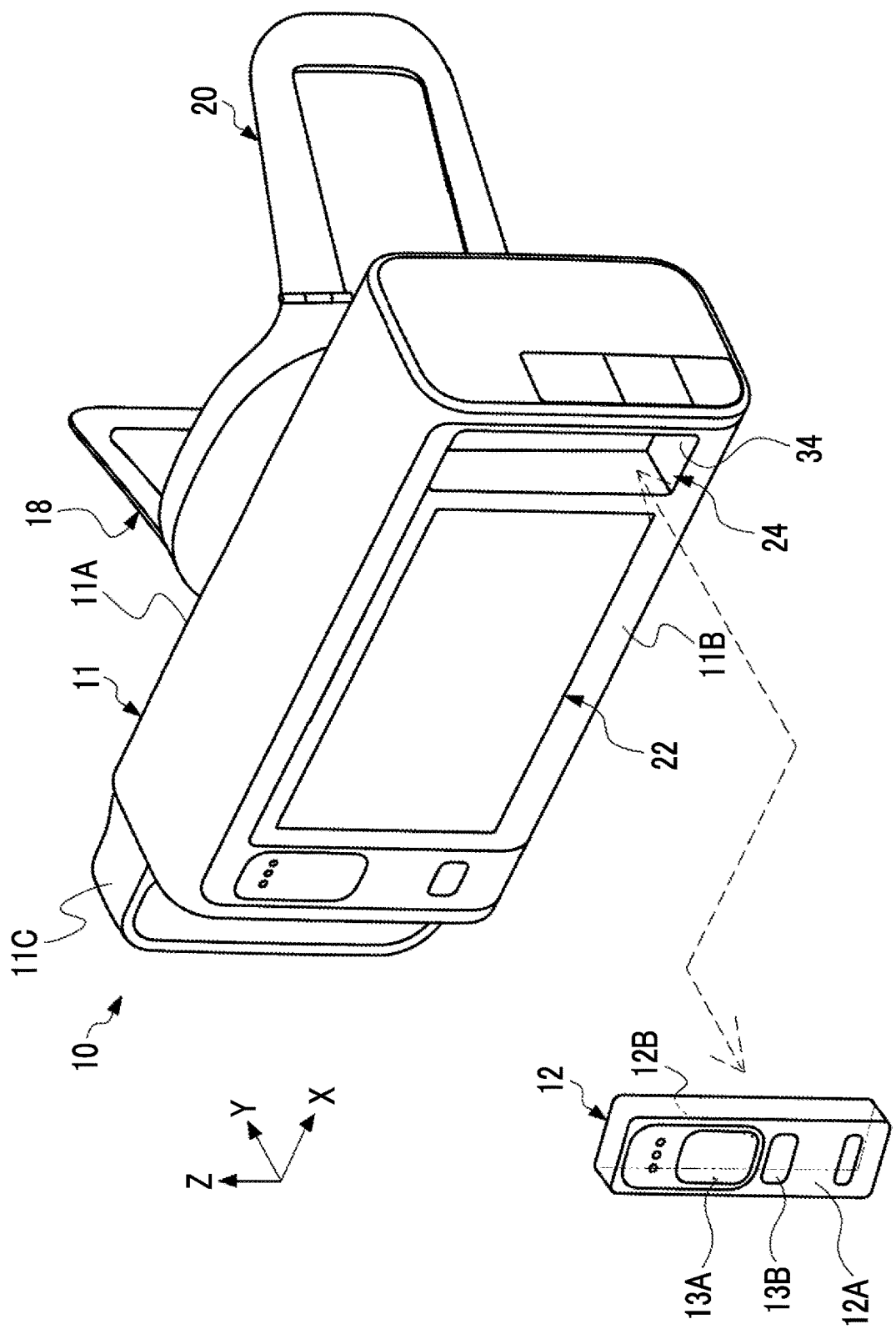
FIG. 2 is an external perspective view showing an example of a configuration of the radiation irradiation device.

As shown in FIG. 2 as an example, the device main body 11 has a substantially rectangular parallelepiped shape having a longitudinal direction in a left-right direction. A tubular portion 18 that protrudes toward an emission direction of the radiation R is provided on a front surface 11A of the device main body 11. The irradiation field limiter (also called a collimator) and the irradiation window, which will be described later, are attached inside the tubular portion 18. Further, a spacing ensuring unit 20 is attached to a distal end of the tubular portion 18. The spacing ensuring unit 20 is a member that extends from the device main body 11 in the emission direction of the radiation R to ensure a spacing between the subject A and the device main body 11. Here, the emission direction is a direction along a central axis RA of a flux of the radiation R. The spacing ensuring unit 20 prevents the subject A from being irradiated with the radiation R in a state in which the device main body 11 is too close to the subject A. The spacing ensuring unit 20 is an example of a "spacing ensuring unit" according to the technology of the present disclosure.

An accommodation portion 24 is provided on a rear surface 11B of the device main body 11. The accommodation portion 24 can attachably and detachably accommodate the remote operation unit 12 in the rear surface 11B of the device main body 11. Specifically, the accommodation portion 24 has a recessed inner wall surface 34. In a state in which the remote operation unit 12 is accommodated in the accommodation portion 24, the inner wall surface 34 faces all surfaces of the remote operation unit 12 except for a back surface 12B. As described above, the accommodation portion 24 attachably and detachably accommodates the remote operation unit 12.

In addition, a display 23 is provided on the rear surface 11B of the device main body 11. The display 23 displays various types of information related to the radiography. The display 23 may be, for example, a liquid crystal display or may be an electro-luminescence (EL) display. The display 23 is an example of a "notification unit" according to the technology of the present disclosure. Further, a grip member 11C is attached to a left side surface of the device main body 11. The user B grips the radiation irradiation device 10 via the grip member 11C.

The remote operation unit 12 has a substantially rectangular parallelepiped shape having a longitudinal direction in an up-down direction in a state of being accommodated in the device main body 11. The remote operation unit 12 has an operation surface 12A and the back surface 12B. An irradiation button 13A and an imaging button 13B are provided on the operation surface 12A.

The irradiation button 13A is an operation button for giving an instruction for the irradiation with the radiation R. In a case where the irradiation button 13A is pressed by the user B, a signal for irradiating with the radiation R is output from the remote operation unit 12 to the device main body 11. In addition, an optical camera 47 (see FIG. 4) is built into the radiation irradiation device 10. The optical camera 47 is an example of an "optical imaging device" according to the technology of the present disclosure. The imaging button 13B is an operation button for giving an instruction for imaging by the optical camera 47. In a case where the imaging button 13B is pressed by the user B, a signal for causing the optical camera 47, which will be described later, to perform imaging is output from the remote operation unit 12 to the device main body 11. The back surface 12B is a surface opposite to the operation surface 12A, and operation keys including the irradiation button 13A and the imaging button 13B are not provided on the back surface 12B.

Here, an example in which the irradiation button 13A and the imaging button 13B are buttons has been described, but this is merely an example. The irradiation button 13A and the imaging button 13B may be cursors, slide switches, or touch pads.

Figure 3:
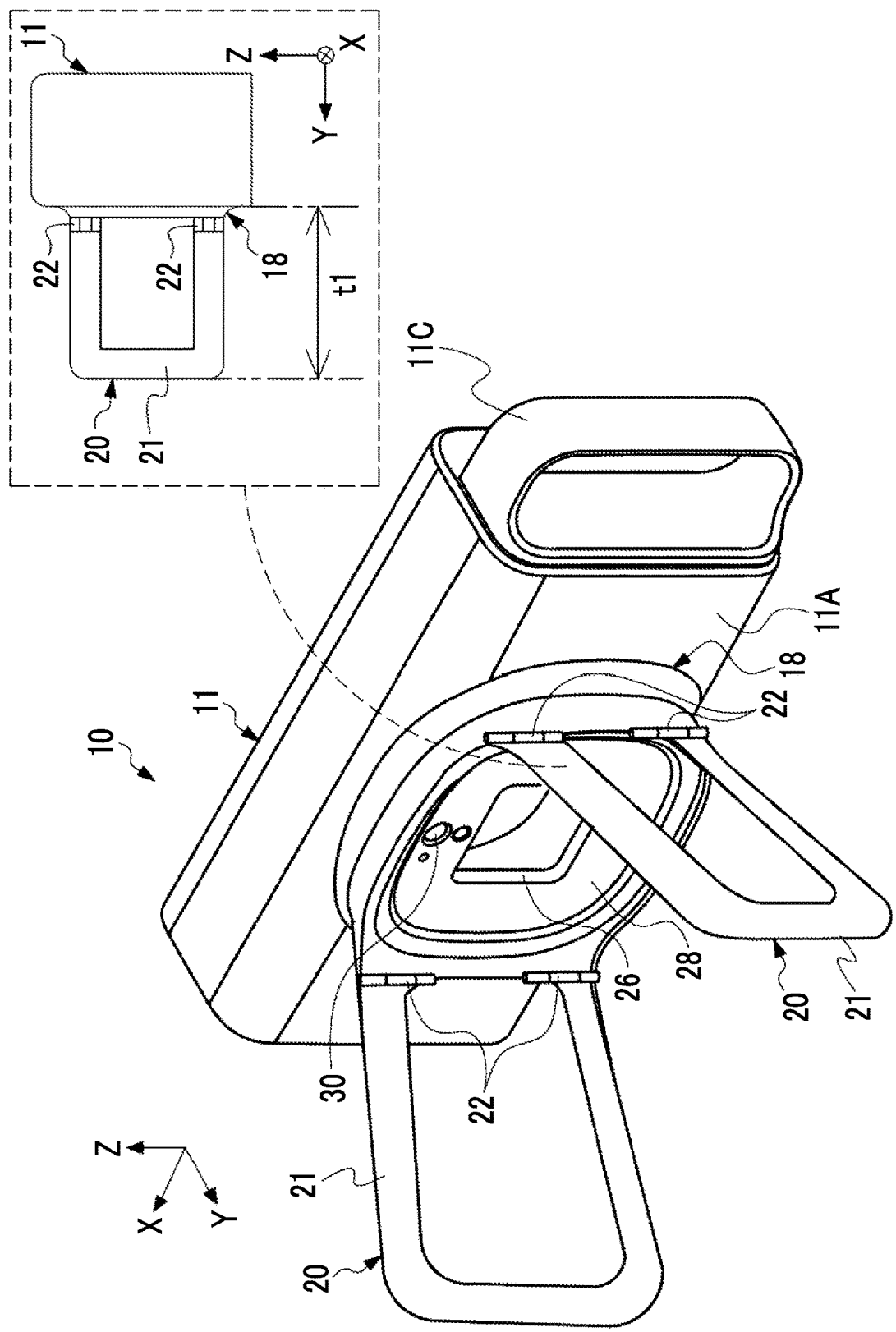
FIG. 3 is an external perspective view showing an example of the configuration of the radiation irradiation device.

As shown in FIG. 3 as an example, the tubular portion 18 protruding from the front surface 11A of the device main body 11 has an irradiation field limiter 26 and an irradiation window 28. The irradiation field limiter 26 is an irradiation field limiter that defines an irradiation range of the radiation R to a predetermined range. In addition, the irradiation window 28 is a window member that is made of a member transparent to the radiation R and partitions an outside and an inside of the tubular portion 18. The radiation R emitted from the radiation tube 15 has an irradiation range defined by the irradiation field limiter 26 and is emitted from the irradiation window toward the subject A. Further, an optical camera 47 (see FIG. 4) is provided in the tubular portion 18. The optical camera 47 is, for example, an imaging device having an image sensor such as a charge coupled device (CCD) image sensor and a complementary metal-oxide-semiconductor (CMOS) image sensor. Reference 30 denotes an imaging window that is a part of a lens of the optical camera 47. Image light of the subject A is incident on the image sensor in the optical camera 47 through the imaging window 30. The optical camera 47 images, for example, the subject A. An optical image of the imaged subject A is used, for example, to perform registration of an irradiation position of the radiation R.

The spacing ensuring unit 20 includes a movable portion 21 and a hinge 22. The movable portion 21 is an example of a "movable portion" according to the technology of the present disclosure. The movable portion 21 is a member that can be displaced with respect to the device main body 11. In the example shown in FIG. 3, the movable portion 21 has a U-shape as viewed in a side view (as viewed in an X direction shown in FIG. 3) and is provided one each on the left and right at a peripheral edge of the tubular portion 18. The hinge 22 is provided at an end portion of the movable portion 21 on the device main body 11 side, and the movable portion 21 is attached to the device main body 11 via the hinge 22. The hinge 22 rotatably supports the movable portion 21. In the example shown in FIG. 3, the hinge 22 rotatably supports the movable portion 21 with an axis along the up-down direction (Z direction shown in FIG. 3) as a rotation axis.

In the example shown in FIG. 3, the spacing ensuring unit 20 is in an unfolded state in which the spacing ensuring unit 20 has a predetermined length t1 from the device main body 11. The predetermined length t1 is a length from the front surface 11A of the device main body 11 to a position of the movable portion 21 farthest from the device main body 11, and is, for example, 20 cm (centimeter). In a case where the spacing ensuring unit 20 is in the unfolded state, the subject A (see FIG. 1) is prevented from being too close to the device main body 11.

Figure 4:
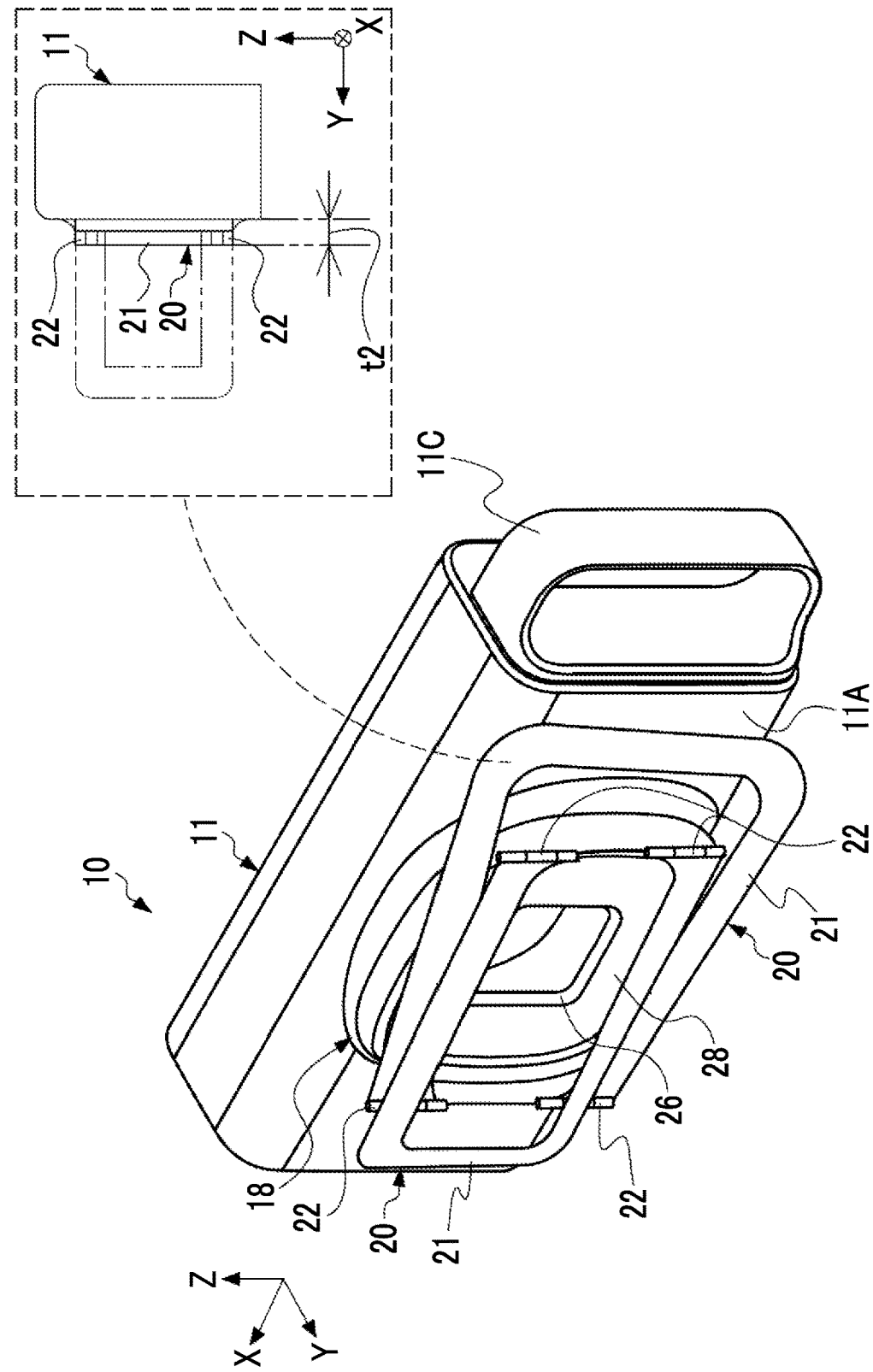
FIG. 4 is an external perspective view showing an example of the configuration of the radiation irradiation device.

As shown in FIG. 4 as an example, the spacing ensuring unit 20 is in a storage state in a case where the movable portion 21 is displaced with the hinge 22 as a center of rotation. In the example shown in FIG. 4, the storage state is achieved by displacing a pair of the movable portions 21 in a direction approaching the device main body 11 in a folded manner. In the storage state, a length t2 of the spacing ensuring unit 20 from the device main body 11 is shorter than the predetermined length t1 in the unfolded state. As described above, in the storage state, the length of the spacing ensuring unit 20 from the device main body 11 is shorter than that in the unfolded state. Therefore, the radiation irradiation device 10 can be made small, and the portability is improved. In addition, in the storage state, since the spacing ensuring unit 20 does not protrude from the device main body 11 as compared with the unfolded state, contact between the outside and the spacing ensuring unit 20 is suppressed, and the radiation irradiation device 10 can be easily handled.

In the spacing ensuring unit 20 in the storage state, the spacing ensuring unit 20 is brought into the unfolded state by displacing the movable portion 21 about the hinge 22 as a center of rotation. In this way, the spacing ensuring unit 20 can be switched between the unfolded state and the storage state. For example, the switching of the state of the spacing ensuring unit 20 is manually performed by a user. In addition, the spacing ensuring unit 20 may have a lock function in which displacement of the movable portion 21 is restricted in each of the storage state and the unfolded state. In this case, the storage state and the unfolded state are switched by displacement of the movable portion 21 after the lock function is released.

Figure 5:
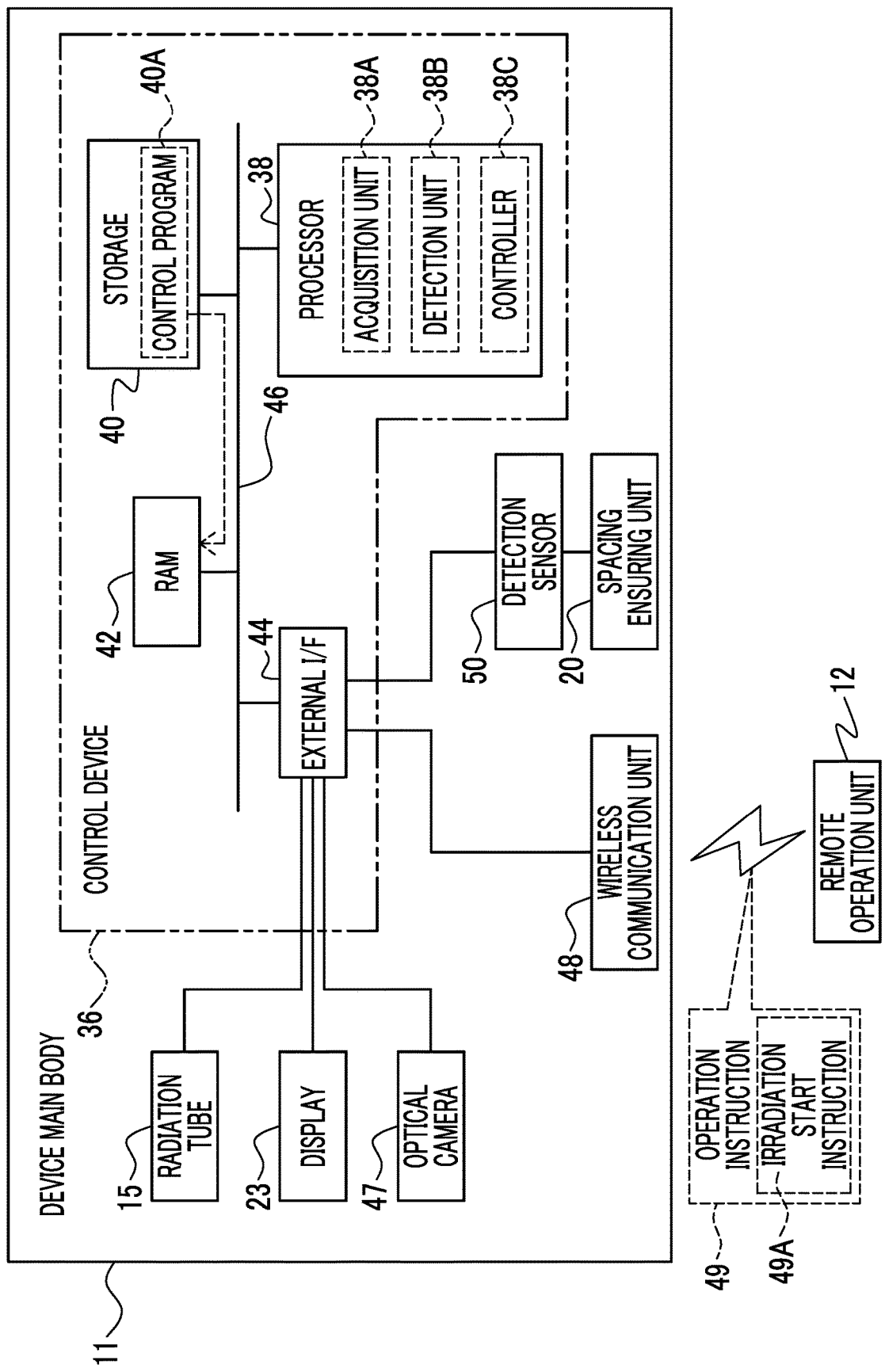
FIG. 5 is a block diagram showing an example of a hardware configuration of an electric system of the radiation irradiation device.

As shown in FIG. 5 as an example, the device main body 11 comprises a control device 36. The control device 36 controls an overall operation of the device main body 11. The control device 36 comprises a processor 38, a storage 40, a random access memory (RAM) 42, and an external interface (I/F) 44. The processor 38, the storage 40, the RAM 42, and the external I/F 44 are connected to a bus 46. The processor 38 is an example of a "processor" according to the technology of the present disclosure.

A memory is connected to the processor 38. The memory includes the storage 40 and the RAM 42. The processor 38 is, for example, a central processing unit (CPU). The processor 38 may be provided with a graphics processing unit (GPU) dedicated to image processing, separately from the CPU.

The storage 40 is a non-volatile storage device that stores various programs, various parameters, and the like. Examples of the storage 40 include a flash memory (for example, an electrically erasable and programmable read only memory (EEPROM) and a solid state drive (SSD)), and/or a hard disk drive (HDD). The flash memory and the HDD are merely an example, and at least one of the flash memory, the HDD, a magnetoresistive memory, or a ferroelectric memory may be used as the storage 40.

The RAM 42 is a memory in which the information is transitorily stored, and is used as a work memory by the processor 38. Examples of the RAM 42 include a dynamic random access memory (DRAM) and a static random access memory (SRAM).

The external I/F 44 is responsible for exchanging various types of information with devices present outside the control device 36. The external I/F 44 is communicably connected to the radiation tube 15, the display 23, and the optical camera 47. In addition, the external I/F 44 is connected to a wireless communication unit 48 and a detection sensor 50, which are described below.

The device main body 11 comprises the wireless communication unit 48. The wireless communication unit 48 wirelessly communicates information including an operation instruction 49 with the remote operation unit 12. A wireless communication system is, for example, a communication system based on specifications of Bluetooth (registered trademark). The operation instruction 49 refers to an instruction to remotely operate the device main body 11. The operation instruction 49 includes an irradiation start instruction 49A to cause the device main body 11 to start the irradiation with the radiation. As another example, the operation instruction 49 includes an instruction to start imaging by the optical camera 47 and/or an instruction to turn off a power supply of the device main body 11. The wireless communication unit 48 is hardware that is used to perform wireless communication with the remote operation unit 12 and is a wireless communication interface (I/F). The wireless communication I/F as the wireless communication unit 48 includes, for example, a communication antenna and a transmission/reception circuit.

Here, although Bluetooth (registered trademark) is illustrated as the wireless communication system between the wireless communication unit 48 and the remote operation unit 12, the technology of the present disclosure is not limited thereto. As the wireless communication system, Zigbee (registered trademark) or infrared communication may be used.

The device main body 11 comprises the detection sensor 50. The detection sensor 50 outputs a signal corresponding to a state of the spacing ensuring unit 20. The signal output from the detection sensor 50 is acquired by the processor 38 via the external I/F 44. Details of the detection sensor 50 will be described below.

However, in the radiation irradiation device 10, for example, in a case where the radiation is emitted while the spacing ensuring unit 20 is not in the unfolded state, a distance between the subject A and the radiation irradiation device 10 may not be ensured. In this case, the irradiation with the radiation under conditions not intended by the user is performed. Therefore, it is necessary for the user to perform the work of checking the unfolded state of the spacing ensuring unit 20 before the irradiation with the radiation by the radiation irradiation device 10. However, in handling the radiation irradiation device 10, such work of checking the state of the spacing ensuring unit 20 is a burden on the user.

Therefore, in view of such circumstances, in the radiation irradiation device 10 according to the present embodiment, in the control device 36, the processor 38 reads out a control program 40A from the storage 40 and executes the read-out control program 40A on the RAM 42. Accordingly, the processor 38 operates as an acquisition unit 38A, a detection unit 38B, and a controller 38C.

As shown in FIG. 6 as an example, the acquisition unit 38A acquires a signal output from the detection sensor 50. The detection sensor 50 is a sensor that can detect displacement of the movable portion 21. The detection sensor 50 is provided in the spacing ensuring unit 20. In the example shown in FIG. 6, the detection sensor 50 is a microswitch 50A provided in the hinge 22. In the hinge 22, a signal corresponding to the state of the spacing ensuring unit 20 is output as the microswitch 50A is pressed in response to the displacement of the movable portion 21. The detection sensor 50 and the microswitch 50A are examples of a "second sensor" according to the technology of the present disclosure.

Although an example of a form in which the detection sensor 50 is the microswitch 50A has been described here, this is merely an example. As the detection sensor 50, for example, an electrical contact provided in the hinge 22 may be used. In this case, conduction in the electrical contact is ensured in response to the displacement of the movable portion 21, so that a signal corresponding to the state of the spacing ensuring unit 20 is output.

Figure 7:
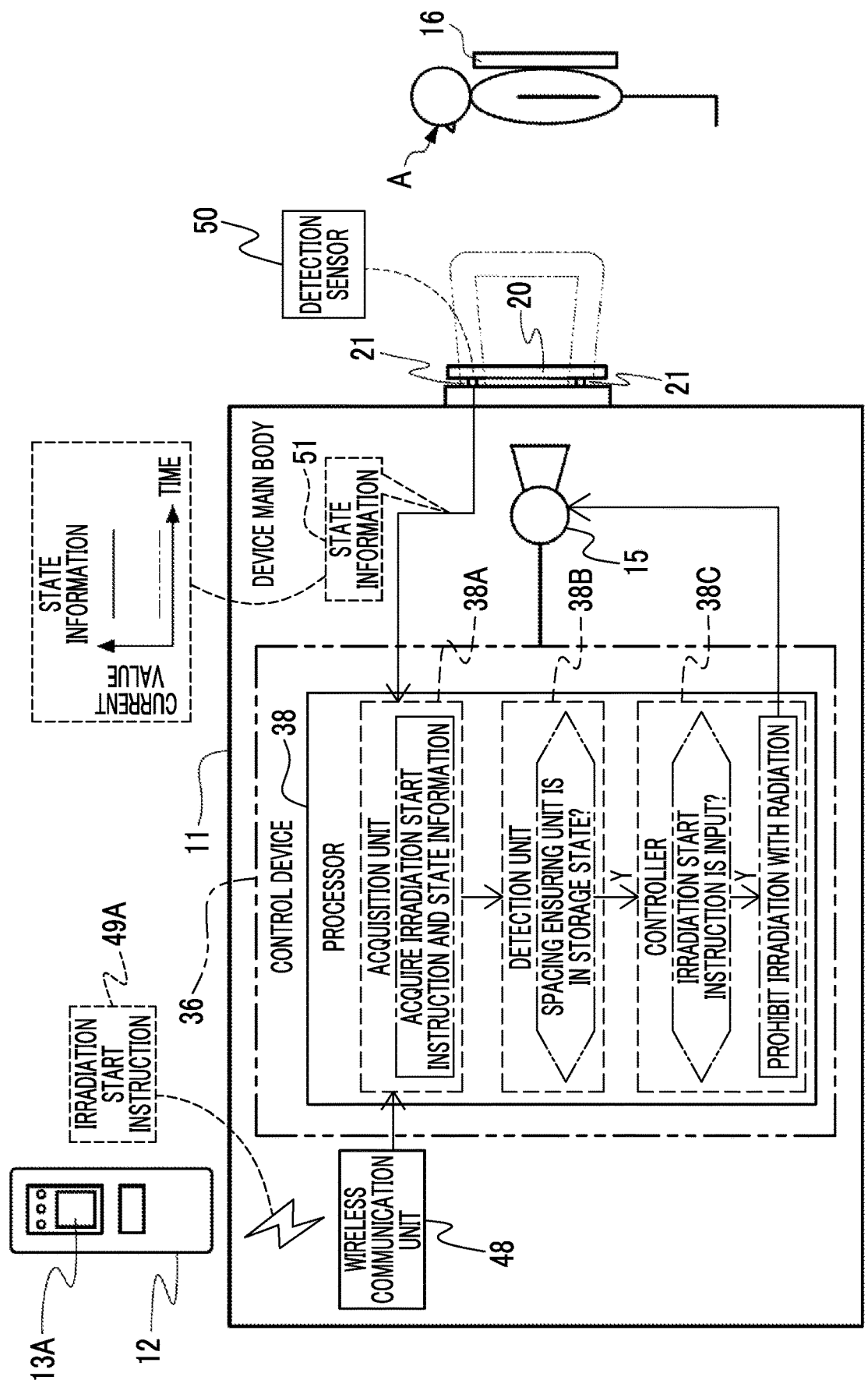
FIG. 7 is a conceptual diagram showing an example of contents of processing of an acquisition unit, a detection unit, and a controller.

As shown in FIG. 7 as an example, it is assumed that the spacing ensuring unit 20 is in the storage state. In this case, the detection sensor 50 outputs a signal corresponding to the storage state of the spacing ensuring unit 20. That is, the detection sensor 50 outputs state information 51. Here, the state information 51 includes information indicating that the spacing ensuring unit 20 is in the storage state. In the example shown in FIG. 7, a current value in the storage state is output as the state information 51, and the current value in the storage state is a higher value than a current value in the unfolded state.

In addition, in a case where the spacing ensuring unit 20 is in the storage state, the irradiation button 13A is operated by the user. In a case where the irradiation button 13A is operated, the irradiation start instruction 49A is transmitted from the remote operation unit 12 to the wireless communication unit 48. The wireless communication unit 48 outputs the received irradiation start instruction 49A to the acquisition unit 38A.

The acquisition unit 38A acquires the state information 51 from the detection sensor 50. In addition, the acquisition unit 38A acquires the irradiation start instruction 49A from the wireless communication unit 48. Moreover, the acquisition unit 38A outputs the state information 51 to the detection unit 38B.

The detection unit 38B detects the state of the spacing ensuring unit 20. Here, the state of the spacing ensuring unit 20 includes the storage state and the unfolded state of the spacing ensuring unit 20. The detection unit 38B detects the state of the spacing ensuring unit 20 based on the state information 51 acquired from the acquisition unit 38A. Specifically, the detection unit 38B detects that the spacing ensuring unit 20 is in the storage state in a case where a current value indicated by the state information 51 is higher than a predetermined value. Here, the predetermined value is appropriately set by a test using an actual device.

The controller 38C executes control according to the state of the spacing ensuring unit 20 detected by the detection unit 38B. For example, the controller 38C executes control related to the irradiation with the radiation as the control. First, in a case where the detection unit 38B detects that the spacing ensuring unit 20 is in the storage state, the controller 38C acquires the irradiation start instruction 49A from the acquisition unit 38A. Then, in a case where the irradiation start instruction 49A is input, the controller 38C prohibits the irradiation with the radiation. Specifically, in a case where the irradiation start instruction 49A is input, the controller 38C stops supplying power, which is used for irradiation with the radiation, to the radiation tube 15. Accordingly, in a case where the spacing ensuring unit 20 is in the storage state, the subject A is not irradiated with the radiation.

As described above, in the radiation irradiation device 10 according to the first embodiment, in the processor 38, the state of the spacing ensuring unit 20 is detected by the detection unit 38B. Then, the controller 38C executes a control according to the state of the spacing ensuring unit 20. For example, in a case where the spacing ensuring unit 20 is in the storage state, the controller 38C prohibits the irradiation with the radiation even in a case where the irradiation start instruction 49A is received. Accordingly, a need for the user to perform work according to the state of the spacing ensuring unit 20 is reduced, and the convenience of the radiation irradiation device 10 is improved.

Further, in the radiation irradiation device 10 according to the first embodiment, in the processor 38, in a case where the irradiation start instruction 49A is input from the remote operation unit 12, the controller 38C performs control related to the irradiation with the radiation according to the state of the spacing ensuring unit 20. Accordingly, since the need to perform the work by the user is reduced as compared with a case where the user checks the state of the spacing ensuring unit 20 and starts the irradiation with the radiation, the convenience of the radiation irradiation device 10 is improved.

Further, in the radiation irradiation device 10 according to the first embodiment, in the processor 38, in a case where the irradiation start instruction 49A is input from the remote operation unit 12, the controller 38C prohibits the irradiation with radiation in a case where the spacing ensuring unit 20 is in the storage state. This suppresses the irradiation with the radiation that is not intended by the user, such as the irradiation with the radiation in a state in which the subject A is close to the radiation irradiation device 10.

For example, in a case where the radiation is emitted while the spacing ensuring unit 20 is not in the unfolded state, the distance between the subject A and the radiation irradiation device 10 may not be ensured. In this case, there is a risk that the irradiation with the radiation is performed under conditions not intended by the user. In the present configuration, since the irradiation with the radiation is prohibited in a case where the spacing ensuring unit 20 is in the storage state, the irradiation with the radiation unintended by the user is suppressed.

Further, in the radiation irradiation device 10 according to the first embodiment, the detection sensor 50 is provided in the hinge 22 of the spacing ensuring unit 20, and the detection sensor 50 outputs the state information 51 according to the state of the spacing ensuring unit 20. In the processor 38, the detection unit 38B detects the state of the spacing ensuring unit 20 based on the state information 51 from the detection sensor 50. Accordingly, a need for the user to perform work according to the state of the spacing ensuring unit 20 is reduced, and the convenience of the radiation irradiation device 10 is improved.

Figure 8:
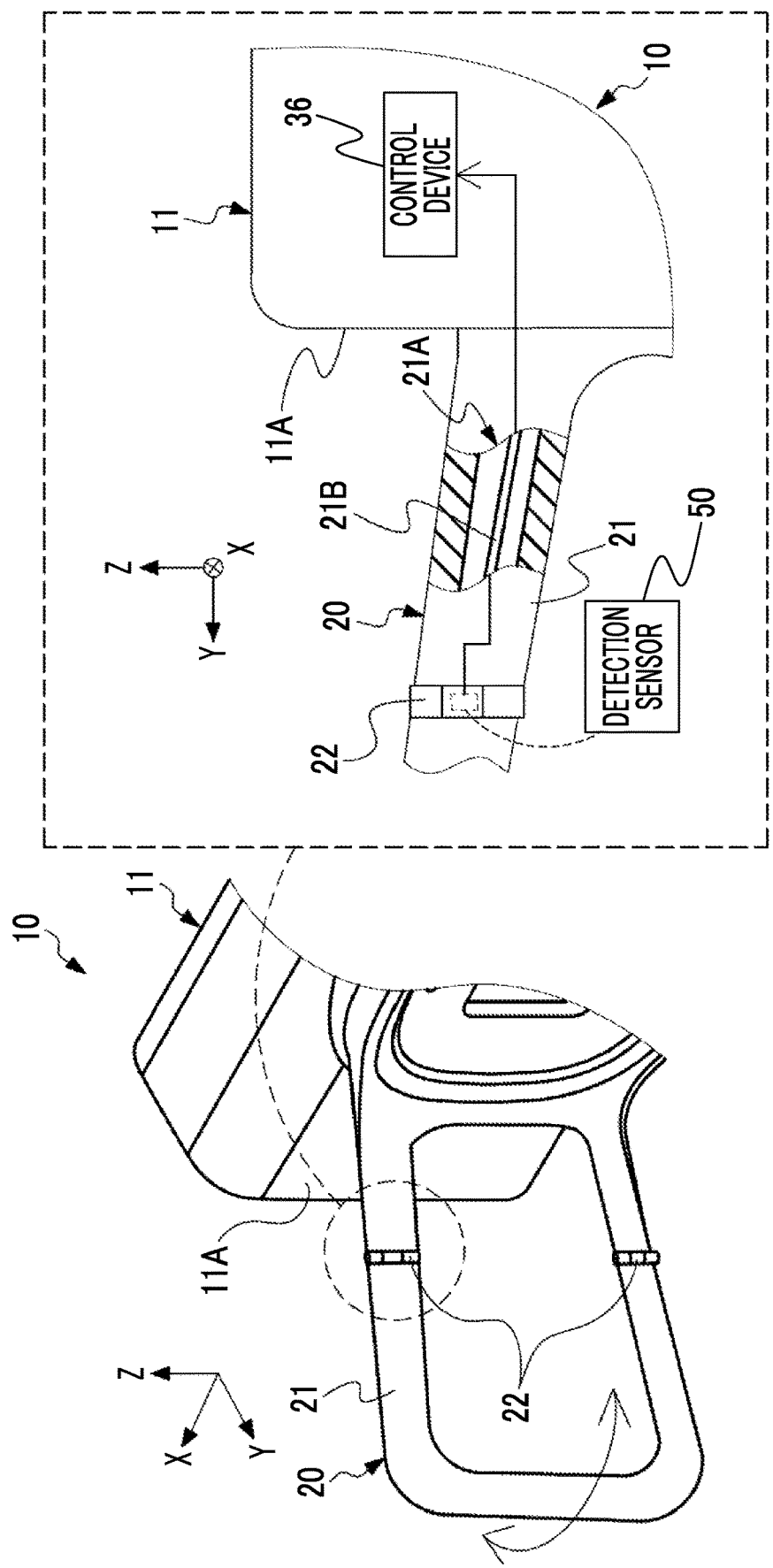
FIG. 8 is a conceptual diagram showing an example of an aspect of an output of a signal corresponding to a state of the spacing ensuring unit by the detection sensor.

Further, in the first embodiment, although an example of a form in which the hinge 22 is provided at the end portion of the movable portion 21 on the device main body 11 side has been described, the technology of the present disclosure is not limited thereto. As shown in FIG. 8 as an example, the hinge 22 may be provided in an intermediate portion of the movable portion 21. In this case, a cavity 21A is formed in the movable portion 21 along a longitudinal direction, and a cable 21B is disposed in the cavity 21A. A signal output from the detection sensor 50 is output to the control device 36 via the cable 21B.

In addition, in the first embodiment, although an example of a form in which the movable portion 21 is displaced via the hinge 22 has been described, the technology of the present disclosure is not limited thereto. As shown in FIG. 9 as an example, the spacing ensuring unit 20 is formed of a soft resin (for example, rubber) having a predetermined elastic modulus, and support plates 20A and 20B are provided inside the spacing ensuring unit 20. Here, an elastic modulus of a material forming the spacing ensuring unit 20 can be appropriately set, for example, by a test using an actual device.

The support plate 20A is provided on a side of the spacing ensuring unit 20 opposite to the device main body 11, and the support plate 20B is provided on the device main body 11 side of the spacing ensuring unit 20. The support plates 20A and 20B have a higher bending stiffness than the soft resin forming the spacing ensuring unit 20. A material of the support plates 20A and 20B is, for example, metal. Since the support plates 20A and 20B have a higher bending stiffness than the soft resin, a portion between the support plate 20A and the support plate 20B functions as a bending portion 20C. In the spacing ensuring unit 20, the detection sensor 50 is provided in the bending portion 20C.

In the spacing ensuring unit 20, a region in which the support plate 20A is embedded functions as the movable portion 21. That is, in the spacing ensuring unit 20, since the bending portion 20C has a lower bending stiffness than other regions, the movable portion 21 is displaced with the bending portion 20C as a center of rotation. The detection sensor 50 outputs a signal corresponding to deformation of the bending portion 20C to the control device 36 (see FIG. 8 and the like).

First Modification Example

In the first embodiment, although an example of a form in which the irradiation with the radiation is prohibited as the control according to the state of the spacing ensuring unit 20 has been described, the technology of the present disclosure is not limited thereto. In the first modification example, a control of giving a notification as to whether the irradiation with the radiation is allowed is performed.

Figure 10:
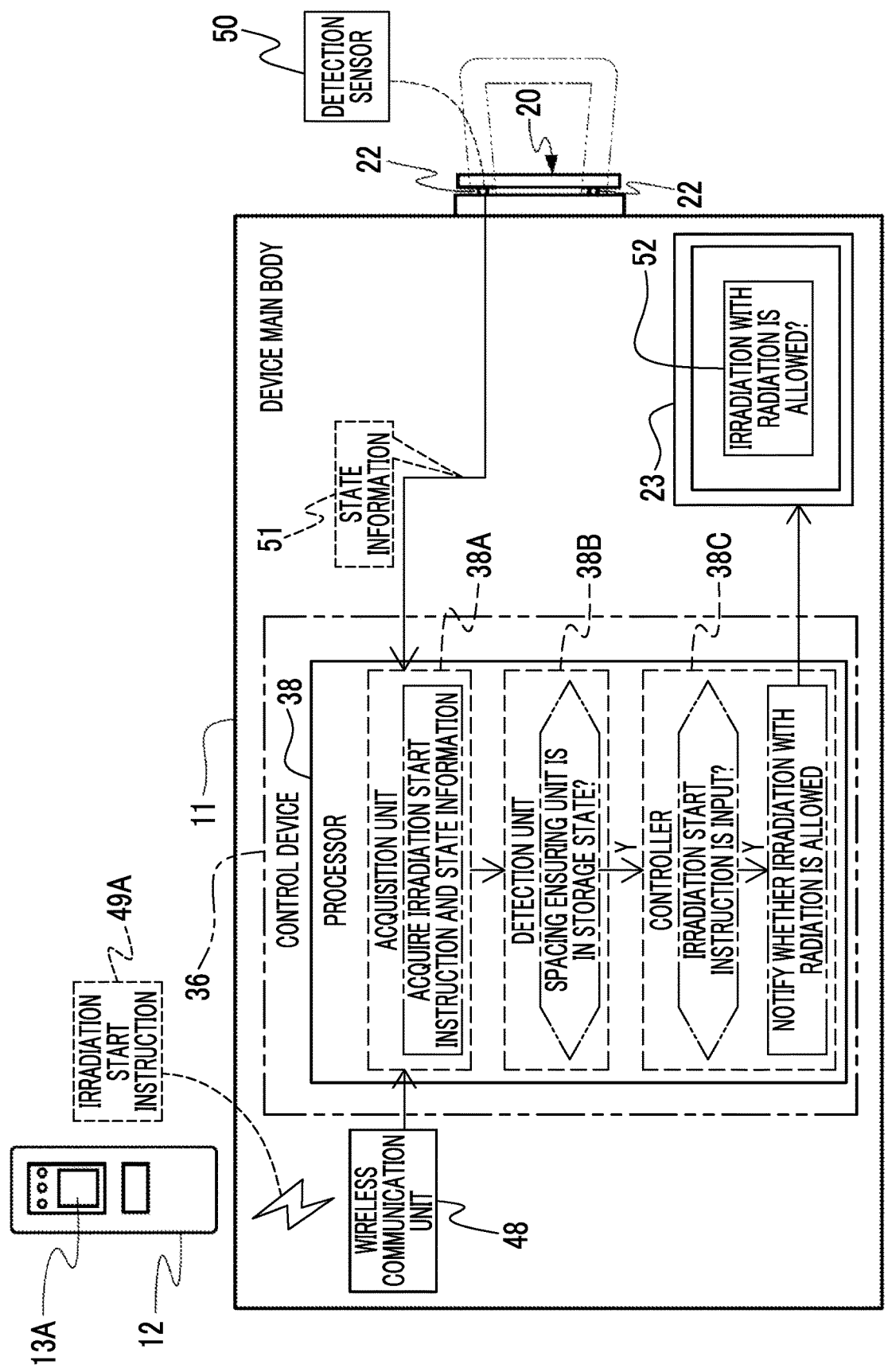
FIG. 10 is a conceptual diagram showing an example of contents of processing of the acquisition unit, the detection unit, and the controller.

As shown in FIG. 10 as an example, the acquisition unit 38A acquires the state information 51 from the detection sensor 50. In addition, the acquisition unit 38A acquires the irradiation start instruction 49A from the wireless communication unit 48. Moreover, the acquisition unit 38A outputs the state information 51 to the detection unit 38B.

In a case where the detection unit 38B detects that the spacing ensuring unit 20 is in the storage state, the controller 38C acquires the irradiation start instruction 49A from the acquisition unit 38A. In a case where the irradiation start instruction 49A is input, the controller 38C gives a notification as to whether the irradiation with the radiation is allowed. Specifically, in a case where the irradiation start instruction 49A is received, the controller 38C displays a message 52 on the display 23. In the example shown in FIG. 10, an example is shown in which a text "Irradiation with radiation is allowed?" is displayed as the message 52. Thus, in a case where the spacing ensuring unit 20 is in the storage state, it is realized to check whether the user is allowed to be irradiated with the radiation.

As described above, in the radiation irradiation device 10 according to the first modification example, in the processor 38, in a case where the irradiation start instruction 49A is input from the remote operation unit 12, the controller 38C gives a notification as to whether the irradiation with the radiation is allowed in a case where the spacing ensuring unit 20 is in the storage state. The user can determine whether to perform or interrupt the irradiation with the radiation after checking the notification content. Accordingly, it is possible to suppress the irradiation with the radiation that is not intended by the user.

For example, in a case where the radiation is emitted while the spacing ensuring unit 20 is not in the unfolded state, the distance between the subject and the radiation irradiation device 10 may not be ensured. In this case, there is a risk that the irradiation with the radiation is performed under conditions not intended by the user. In the present configuration, in a case where the spacing ensuring unit 20 is in the storage state, a notification is given as to whether the irradiation with the radiation is allowed in a case where the irradiation start instruction 49A is received. As a result, the irradiation with the radiation that is not intended by the user is suppressed.

Second Modification Example

In the first embodiment, although an example of a form in which the irradiation with the radiation is prohibited as the control according to the state of the spacing ensuring unit 20 has been described, the technology of the present disclosure is not limited thereto. In the second modification example, a control of permitting the irradiation with the radiation is performed.

Figure 11:
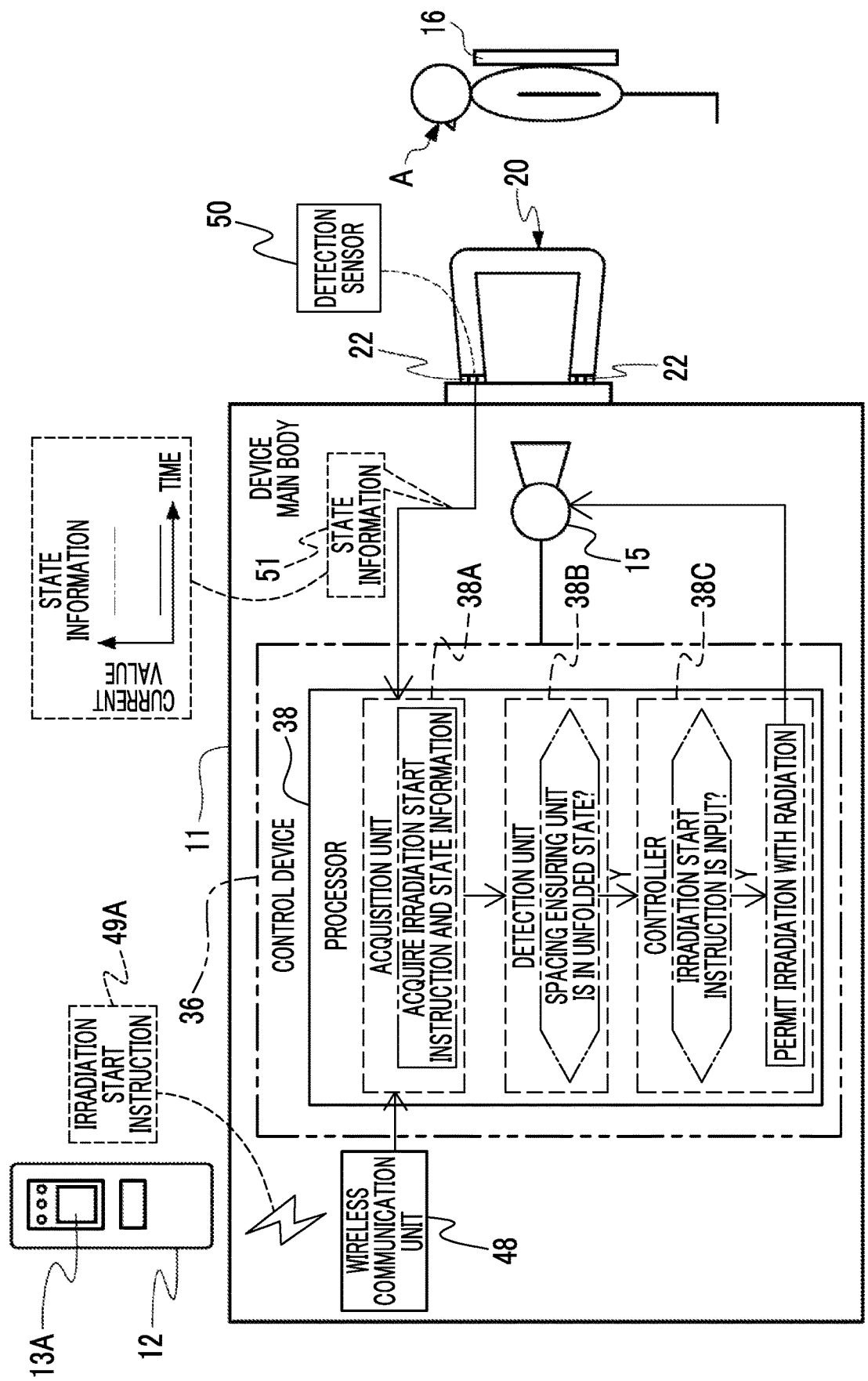
FIG. 11 is a conceptual diagram showing an example of contents of processing of the acquisition unit, the detection unit, and the controller.

As shown in FIG. 11 as an example, in a case where the spacing ensuring unit 20 is in the unfolded state, the detection sensor 50 outputs the state information 51. In the example shown in FIG. 11, a current value at which the spacing ensuring unit 20 is in the unfolded state is output as the state information 51. The current value at which the spacing ensuring unit 20 is in the unfolded state is a lower value than a current value at which the spacing ensuring unit 20 is in the storage state.

The acquisition unit 38A acquires the state information 51 from the detection sensor 50. In addition, the acquisition unit 38A acquires the irradiation start instruction 49A from the wireless communication unit 48. Moreover, the acquisition unit 38A outputs the state information 51 to the detection unit 38B.

In a case where the detection unit 38B detects that the spacing ensuring unit 20 is in the unfolded state, the controller 38C acquires the irradiation start instruction 49A from the acquisition unit 38A. In a case where the irradiation start instruction 49A is input, the controller 38C performs a control to permit the irradiation with the radiation. Specifically, the controller 38C controls the radiation tube 15 such that the radiation R is emitted with a predetermined tube voltage, tube current, and irradiation time based on the irradiation start instruction 49A.

As described above, in the radiation irradiation device 10 according to the second modification example, in the processor 38, in a case where the irradiation start instruction 49A is input from the remote operation unit 12, the controller 38C permits the irradiation with the radiation in a case where the spacing ensuring unit 20 is in the unfolded state. Accordingly, it is possible to suppress the irradiation with the radiation that is not intended by the user.

For example, the fact that the spacing ensuring unit 20 is in the unfolded state means that the distance between the subject A and the radiation irradiation device 10 is ensured. In this case, it is possible to perform the irradiation with the radiation under conditions intended by the user. In the present configuration, in a case where the spacing ensuring unit 20 is in the unfolded state, the irradiation with the radiation is permitted in a case where the irradiation start instruction 49A is received. As a result, the irradiation with the radiation that is not intended by the user is suppressed.

Second Embodiment

In the first embodiment, although an example of a form in which the irradiation with the radiation is prohibited as the control according to the state of the spacing ensuring unit 20 has been described, the technology of the present disclosure is not limited thereto. In the second embodiment, a control of starting preparation for the irradiation with the radiation is performed.

Figure 12:
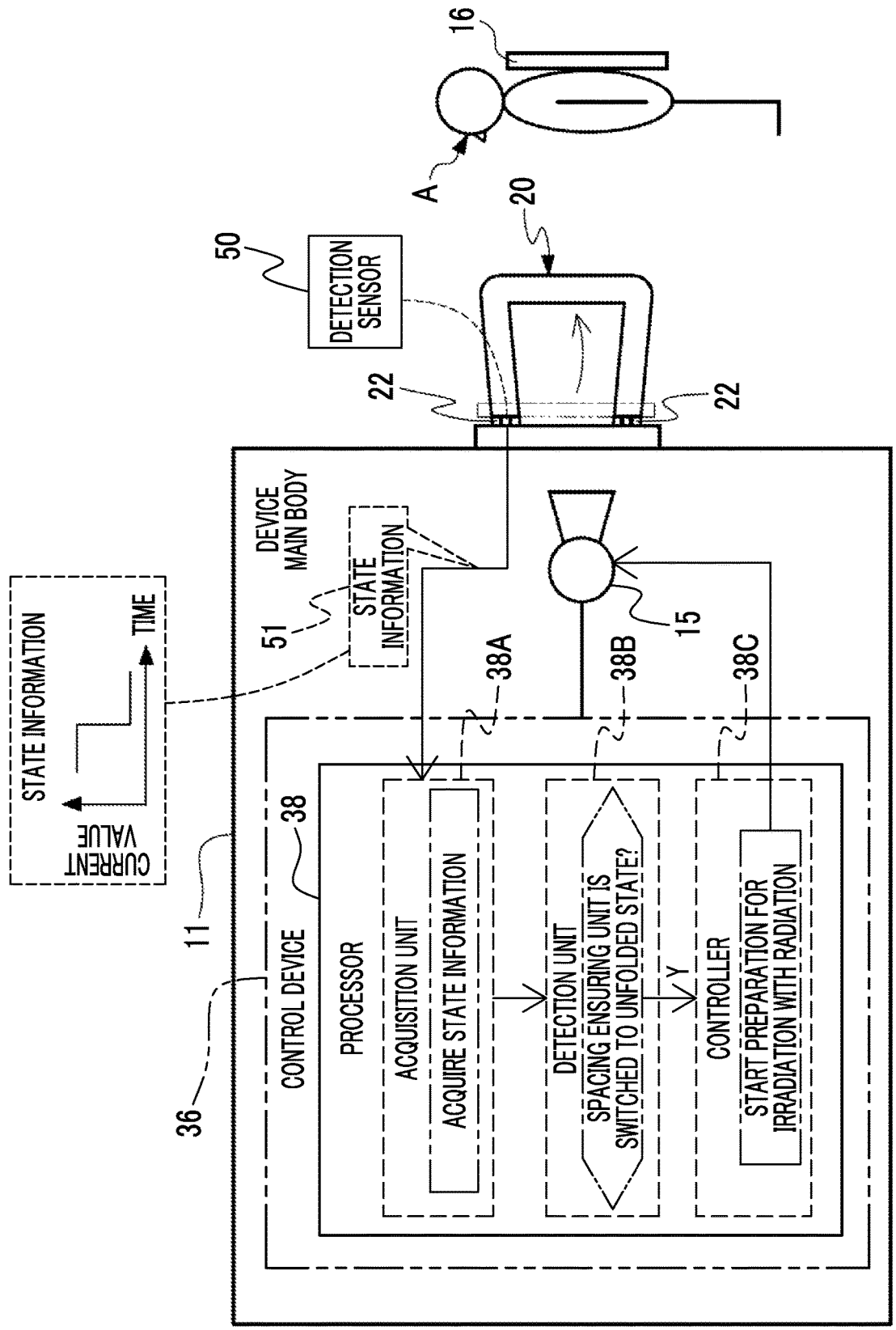
FIG. 12 is a conceptual diagram showing an example of contents of processing of the acquisition unit, the detection unit, and the controller.

As shown in FIG. 12 as an example, in a case where the spacing ensuring unit 20 is switched from the storage state to the unfolded state, the detection sensor 50 outputs the state information 51 to the acquisition unit 38A. Here, the state information 51 includes information indicating that the spacing ensuring unit 20 is switched from the storage state to the unfolded state. In the example shown in FIG. 12, as the state information 51, a change in current value from a relatively high value in a case where the spacing ensuring unit 20 is in the storage state to a relatively low value in a case where the spacing ensuring unit 20 is in the unfolded state is output.

The detection unit 38B detects the state of the spacing ensuring unit 20 based on the state information 51 acquired from the acquisition unit 38A. Specifically, the detection unit 38B detects that the spacing ensuring unit 20 is switched from the storage state to the unfolded state in a case where the change in current value is a negative value smaller than a predetermined difference. Here, the predetermined difference can be appropriately set based on, for example, a test using an actual device.

In a case where the detection unit 38B detects that the spacing ensuring unit 20 is switched from the storage state to the unfolded state, the controller 38C starts preparation for the irradiation with the radiation. Specifically, the controller 38C causes a driving unit (not shown) to start a preparation operation. Here, the driving unit includes, for example, a high-voltage generation unit (not shown) which generates a high voltage to be applied to the radiation tube 15. The preparation operation includes an operation of causing a transformer of the high-voltage generation unit to start boosting. Further, in a case where the radiation tube 15 has a filament (not shown) that emits thermionic electrons as a cathode, the preparation operation includes an operation of causing a current to flow through the filament to heat the filament, and the like.

As described above, in the radiation irradiation device 10 according to the second embodiment, in the processor 38, in a case where the spacing ensuring unit 20 is switched from the storage state to the unfolded state, the controller 38C starts preparation for the irradiation with the radiation. Therefore, a time required to prepare for the irradiation with the radiation is shortened, which improves the convenience of the radiation irradiation device 10.

Third Modification Example

In the second embodiment, although an example of a form in which the preparation for the irradiation with the radiation is started in a case where the spacing ensuring unit 20 is switched from the storage state to the unfolded state has been described, the technology of the present disclosure is not limited thereto. In the third modification example, in a case where the spacing ensuring unit 20 is switched from the storage state to the unfolded state, at least a part of functions, which are stopped, of the device main body 11 is released.

Figure 13:
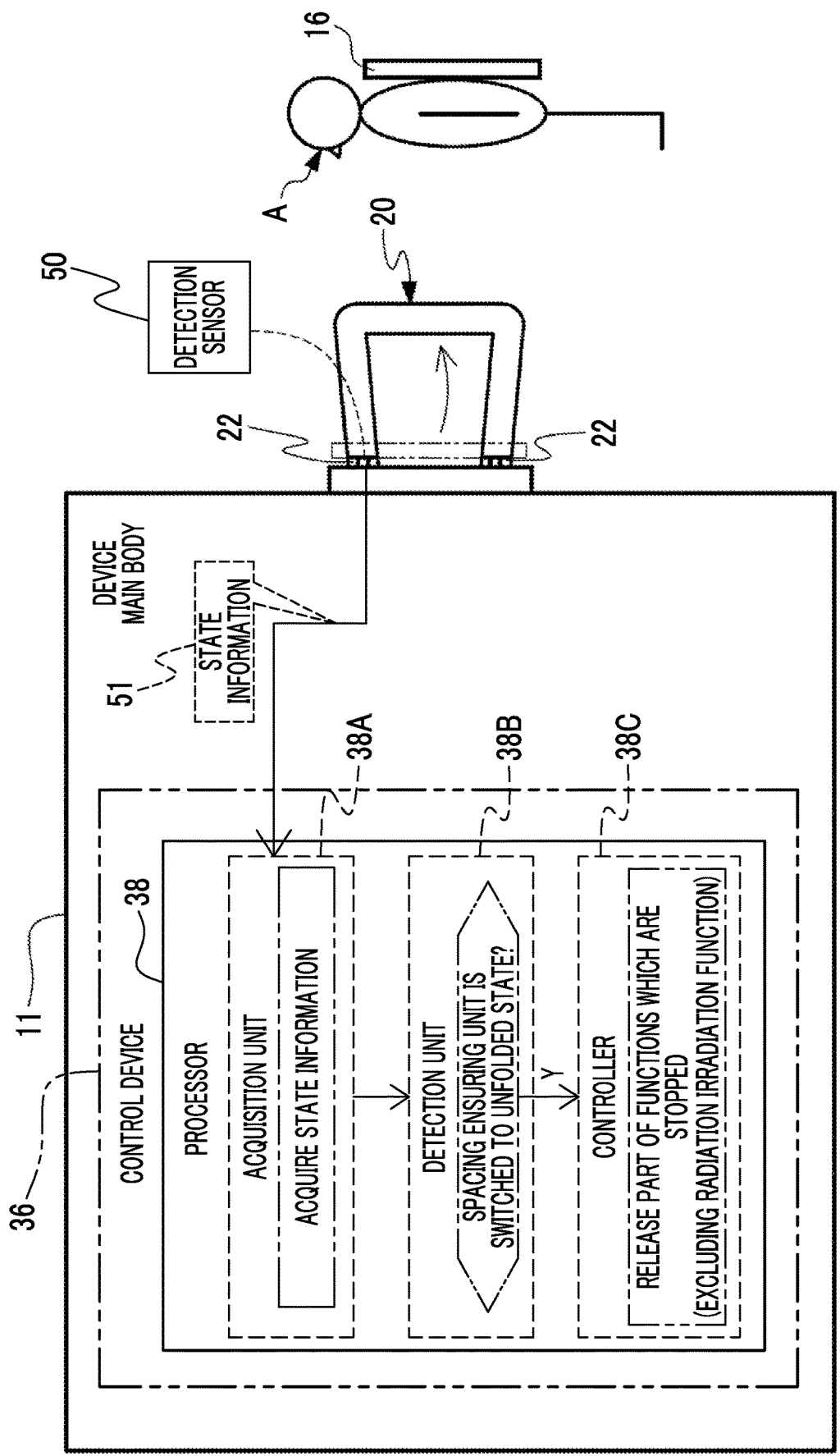
FIG. 13 is a conceptual diagram showing an example of contents of processing of the acquisition unit, the detection unit, and the controller.

As shown in FIG. 13 as an example, in a case where the spacing ensuring unit 20 is switched from the storage state to the unfolded state, the detection sensor 50 outputs the state information 51 to the acquisition unit 38A. Moreover, the acquisition unit 38A outputs the acquired state information 51 to the detection unit 38B.

In a case where the detection unit 38B detects that the spacing ensuring unit 20 is switched from the storage state to the unfolded state, the controller 38C releases at least a part of the functions of the device main body 11, which are stopped in the storage state. For example, it is assumed that the device main body 11 is in a dormant state and functions of the device main body 11 other than a function of receiving an input from the user are stopped. In this dormant state, in a case where it is detected that the spacing ensuring unit 20 is switched from the storage state to the unfolded state, the controller 38C starts the functions of the device main body 11, which have been stopped.

In addition, in this case, a function of performing irradiation with the radiation (for example, a function including the preparation for irradiation with the radiation and the irradiation) among the stopped functions remains stopped while an additional operation (for example, pressing the irradiation button 13A) is not performed. For example, in a case where the irradiation button 13A is pressed by the user and the irradiation start instruction 49A is input from the remote operation unit 12, the function of performing irradiation with the radiation is started.

As described above, in the radiation irradiation device 10 according to the third modification example, in the processor 38, in a case where the spacing ensuring unit 20 is switched from the storage state to the unfolded state, the controller 38C releases at least a part of the functions of the device main body 11, which have been stopped in the storage state. Therefore, the user does not need to perform an operation of releasing the stop of the function of the device main body 11, so that the convenience of the radiation irradiation device 10 is improved.

Further, for example, the fact that the spacing ensuring unit 20 is brought into the unfolded state from the storage state means that the irradiation with the radiation is prepared. Since the stop of the function is released in a state in which the irradiation with the radiation is prepared, an operation is started in a case where power is required, and an unnecessary power consumption of the radiation irradiation device 10 can be reduced.

Further, in the radiation irradiation device 10 according to the third modification example, even in a case where the spacing ensuring unit 20 is switched to the unfolded state, the function of performing the irradiation with the radiation remains stopped. The function of performing the irradiation with the radiation consumes a lot of power, such as applying a voltage to the transformer of the high-voltage generation unit, or causing a current to flow through the filament. Therefore, the function of performing the irradiation with the radiation remains stopped, so that the unnecessary power consumption of the radiation irradiation device 10 can be reduced.

Fourth Modification Example

In the second embodiment, although an example of a form in which the preparation for the irradiation with the radiation is started in a case where the spacing ensuring unit 20 is switched from the storage state to the unfolded state has been described, the technology of the present disclosure is not limited thereto. In the fourth modification example, in a case where the spacing ensuring unit 20 is switched from the storage state to the unfolded state, an imaging function by the optical camera 47 is started.

Figure 14:
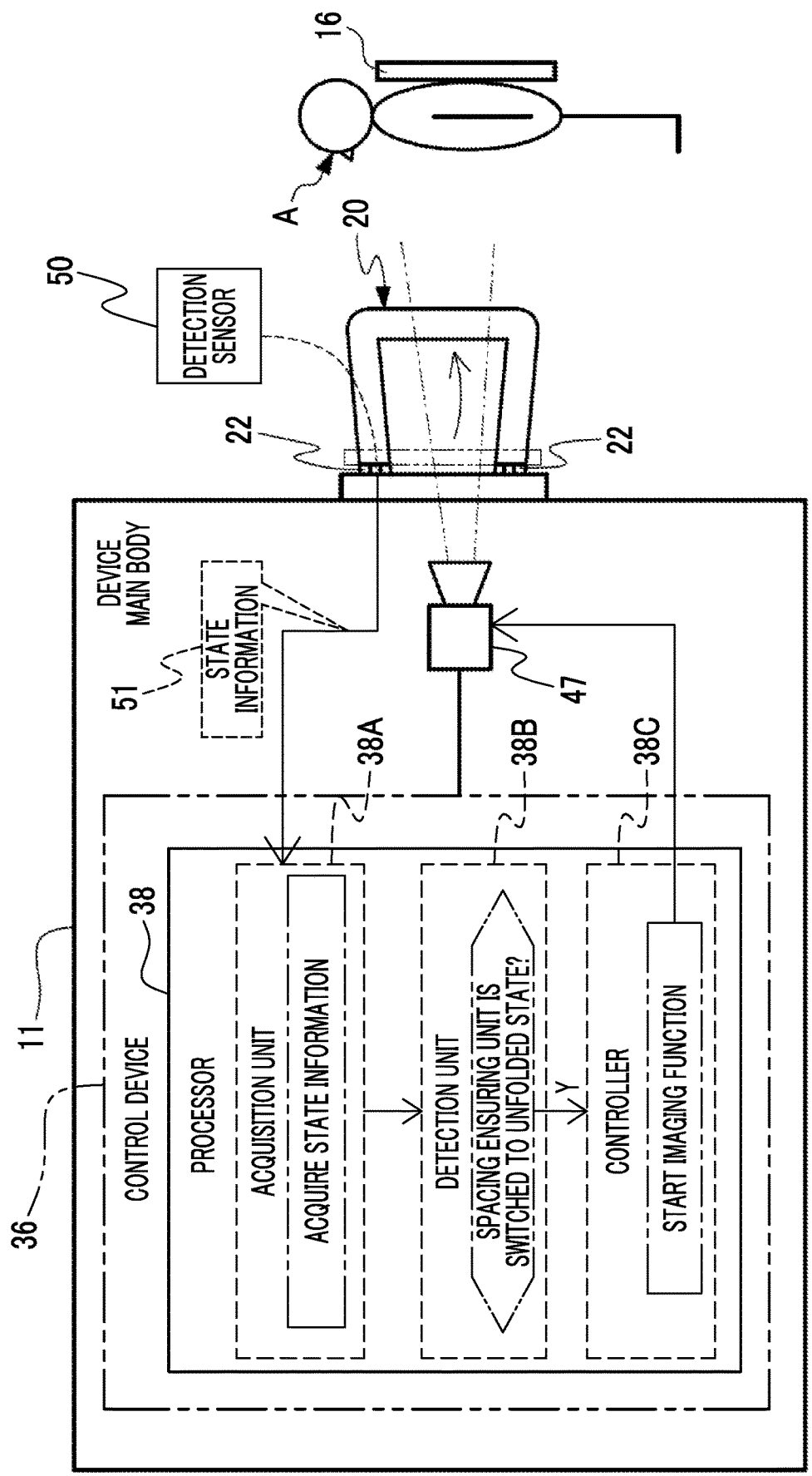
FIG. 14 is a conceptual diagram showing an example of contents of processing of the acquisition unit, the detection unit, and the controller.

As shown in FIG. 14 as an example, in a case where the spacing ensuring unit 20 is switched from the storage state to the unfolded state, the detection sensor 50 outputs the state information 51 to the acquisition unit 38A. Moreover, the acquisition unit 38A outputs the acquired state information 51 to the detection unit 38B.

In a case where the detection unit 38B detects that the spacing ensuring unit 20 is switched from the storage state to the unfolded state, the controller 38C starts the imaging function by the optical camera 47. Here, the imaging function includes a function of displaying an optical image 47A obtained by imaging or transmitting the optical image 47A to the outside, in addition to imaging itself performed by the optical camera 47. For example, the imaging function also includes a function of the display 23 for displaying the optical image 47A or a function of transmitting the optical image 47A to the outside.

For example, it is assumed that the device main body 11 is in a dormant state and functions of the device main body 11 other than a function of receiving an input from the user are stopped. In this dormant state, in a case where it is detected that the spacing ensuring unit 20 is switched from the storage state to the unfolded state, the controller 38C starts only the imaging function by the optical camera 47 among the functions of the device main body 11, which have been stopped. In other words, functions other than the imaging function among the stopped functions remain stopped. The user uses the optical camera 47 to perform registration before irradiating the subject A with the radiation.

As described above, in the radiation irradiation device 10 according to the fourth modification example, in the processor 38, in a case where the spacing ensuring unit 20 is switched from the storage state to the unfolded state, the controller 38C causes only the optical camera 47 to start an operation. Therefore, it is possible to reduce the unnecessary power consumption of the radiation irradiation device 10 by operating only the optical camera 47 required for the preparation before the irradiation with the radiation.

In the second embodiment and each modification example, although an example of a from in which various controls are executed by the controller 38C in a case where it is detected that the spacing ensuring unit 20 is switched from the storage state to the unfolded state has been described, the technology of the present disclosure is not limited thereto. The technology of the present disclosure is established as long as it can be detected that the spacing ensuring unit 20 is in the unfolded state. For example, an aspect may be employed in which various controls are executed by the controller 38C in a case where it is detected that the spacing ensuring unit 20 is switched from an intermediate state between the storage state and the unfolded state to the unfolded state.

Third Embodiment

In the first embodiment, although an example of a form in which the irradiation with the radiation is prohibited as the control according to the state of the spacing ensuring unit 20 has been described, the technology of the present disclosure is not limited thereto. In the third embodiment, a notification regarding the state of the spacing ensuring unit 20 is given.

Figure 15:
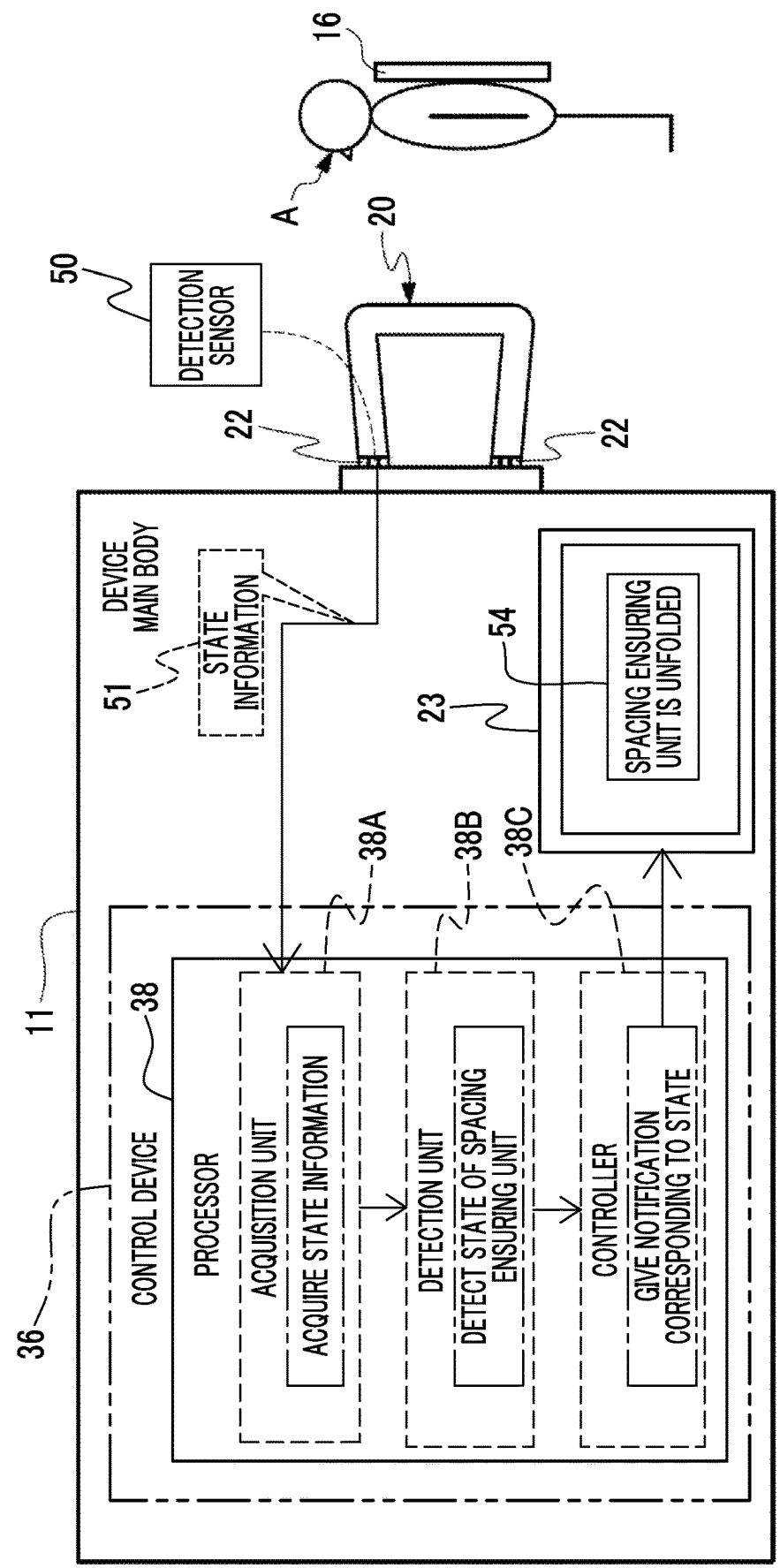
FIG. 15 is a conceptual diagram showing an example of contents of processing of the acquisition unit, the detection unit, and the controller.

As shown in FIG. 15 as an example, the detection sensor 50 outputs the state information 51 to the acquisition unit 38A. Moreover, the acquisition unit 38A outputs the acquired state information 51 to the detection unit 38B.

The detection unit 38B detects the state of the spacing ensuring unit 20. Here, the state of the spacing ensuring unit 20 includes the unfolded state and the storage state. The detection unit 38B detects the state based on the state information 51 acquired from the acquisition unit 38A. For example, the detection unit 38B detects the state by comparing the current value indicated by the state information 51 with a predetermined value. Specifically, the detection unit 38B detects that the spacing ensuring unit 20 is in the unfolded state in a case where the current value indicated by the state information 51 is lower than the predetermined value.

The controller 38C executes a notification control according to the state detected by the detection unit 38B. For example, the controller 38C displays a message 54 on the display 23.

Specifically, the controller 38C performs a graphical user interface (GUI) control for displaying the message 54 to display a screen including the message 54 on the display 23. In the example shown in FIG. 15, a text "Spacing ensuring unit is unfolded" is displayed on the display 23 as the message 54. The user can recognize the state of the spacing ensuring unit 20 by viewing the message 54 displayed on the display 23.

Although an example of a form in which the message 54 is displayed has been described here, this is merely an example. The content of the message 54 can be set as appropriate. In addition, a mark indicating the state of the spacing ensuring unit 20 may be displayed instead of the message 54 or together with the message 54.

As described above, in the radiation irradiation device 10 according to the third embodiment, in the processor 38, the controller 38C causes the display 23 to give a notification corresponding to the state of the spacing ensuring unit 20. Accordingly, it is realized to make the user recognize the state of the spacing ensuring unit 20.

In the third embodiment, although an example of a form in which the state of the spacing ensuring unit 20 is notified by the display 23 has been described, the technology of the present disclosure is not limited thereto. The state of the spacing ensuring unit 20 may be displayed by a display lamp (not shown) provided in the device main body 11 instead of the display 23 or together with the display 23. The display lamp is provided, for example, on an upper surface of the device main body 11 and protrudes outward from the upper surface. The display lamp is, for example, a display lamp in which a light-emitting diode (LED) is used as a light source.

For example, an aspect in which the display lamp is turned on in a case where the spacing ensuring unit 20 is in the unfolded state may be employed, but this is merely an example. The display lamp may blink, or a color of the display lamp may change depending on the state of the spacing ensuring unit 20 (for example, in a case where the spacing ensuring unit 20 is in the storage state, the color is blue, and in a case where the spacing ensuring unit 20 is in the unfolded state, a red color is turned).

In the third embodiment, although an example of a form in which the state of the spacing ensuring unit 20 is visually notified by the display 23 or the display lamp has been described, the technology of the present disclosure is not limited thereto. For example, the state of the spacing ensuring unit 20 may be notified by a voice through a speaker (not shown) provided in the device main body 11.

Fourth Embodiment

In the first embodiment, although an example of a form in which the control according to the state of the spacing ensuring unit 20 is performed has been described, the technology of the present disclosure is not limited thereto. In the fourth embodiment, in a case where the spacing ensuring unit 20 is brought into the unfolded state, the power supply of the device main body 11 is turned on.

Figure 16:
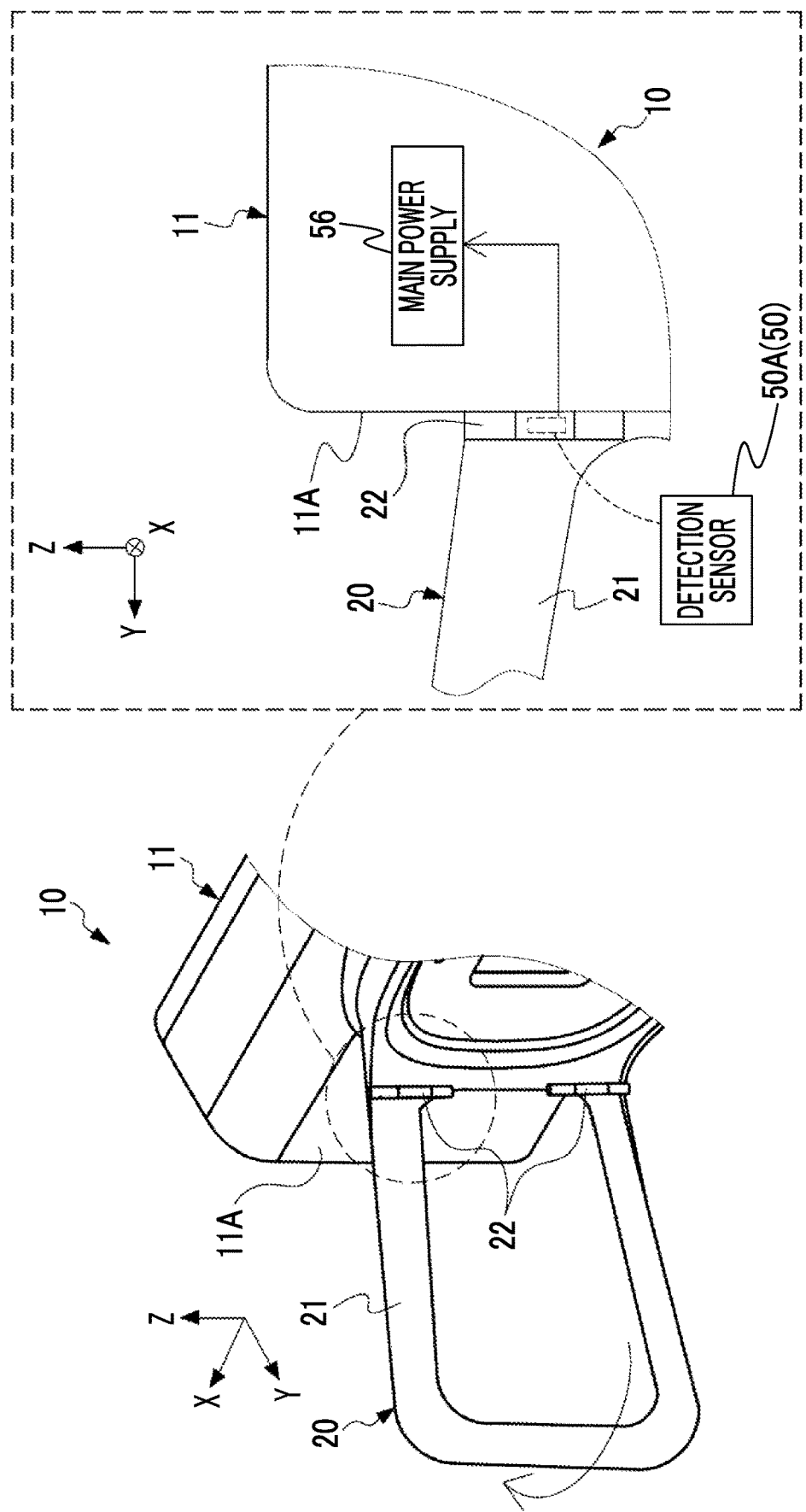
FIG. 16 is a conceptual diagram showing an example of an aspect of an output of a signal corresponding to a state of the spacing ensuring unit by the detection sensor.

First, in a case where the spacing ensuring unit 20 is in the storage state, it is assumed that the power supply of the device main body 11 is turned off. That is, a main power supply 56 of the device main body 11 is turned off. Then, as shown in FIG. 16 as an example, in a case where the spacing ensuring unit 20 is switched from the storage state to the unfolded state, the power supply of the device main body 11 is turned on. That is, the main power supply 56 of the device main body 11 is turned on. For example, in a case where the detection sensor 50 is the microswitch 50A provided on the hinge 22, the microswitch 50A is pressed in a case where the spacing ensuring unit 20 is brought into the unfolded state.

The microswitch 50A is a start-up switch for the main power supply 56. Therefore, in a case where the spacing ensuring unit 20 is in the unfolded state, the main power supply 56 is turned on. In this way, in a case where the spacing ensuring unit 20 is switched from the storage state to the unfolded state, the power supply of the device main body 11 is turned on. Here, although an example of a form in which the spacing ensuring unit 20 is switched from the storage state to the unfolded state has been described, this is merely an example. A configuration in which the power supply is turned on in a case where the spacing ensuring unit 20 is changed from the intermediate state to the unfolded state may be employed.

As described above, in the radiation irradiation device 10 according to the fourth embodiment, in a case where the spacing ensuring unit 20 is switched from the storage state to the unfolded state, the power supply of the device main body 11 is turned on. Therefore, the user does not need to operate the power supply, so that the convenience of the radiation irradiation device 10 is improved.

Further, for example, the fact that the spacing ensuring unit 20 is switched to the unfolded state means that the irradiation with the radiation is prepared. Since the power supply is turned on in a state in which the irradiation with the radiation is prepared, the main power supply 56 is turned on in a case where the power is required, and the unnecessary power consumption of the radiation irradiation device 10 can be reduced.

As a matter of course, the various controls executed by the controller 38C described in the first to third embodiments and each modification example may be executed in combination. That is, the controls described in the first to third embodiments and each modification example may be appropriately selected and executed depending on the state of the spacing ensuring unit 20. In addition, the user may be able to select in advance which of the controls described in the first to third embodiments and each modification example is to be performed.

As a matter of course, the function described in the fourth embodiment may be executed in combination with the various controls executed by the controller 38C described in the first to third embodiments and each modification example. That is, after the power supply of the device main body 11 is turned on by the function described in the fourth embodiment, the controls described in the first to third embodiments and each modification example may be appropriately selected and executed depending on the state of the spacing ensuring unit 20.

Fifth Modification Example

In the first embodiment, although an example of a form in which the detection sensor 50 is provided in the spacing ensuring unit 20 has been described, the technology of the present disclosure is not limited thereto. In the fifth modification example, the detection sensor 50 is provided in the device main body 11.

Figure 17:
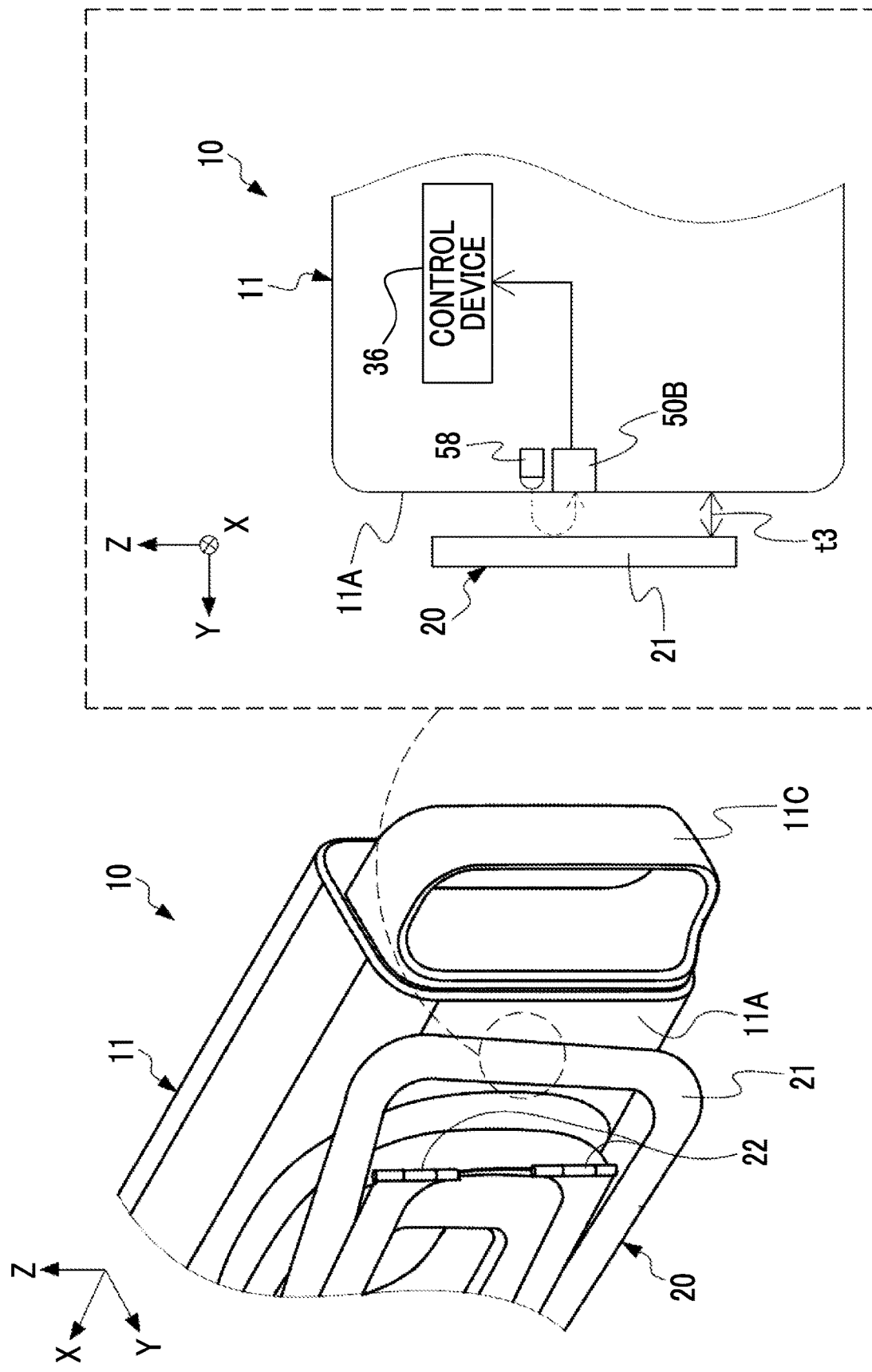
FIG. 17 is a conceptual diagram showing an example of an aspect of an output of a signal corresponding to a state of a spacing ensuring unit by a detection sensor.

As shown in FIG. 17 as an example, a photoelectric sensor 50B is provided as the detection sensor 50 on the front surface 11A of the device main body 11. The photoelectric sensor 50B is an example of a "first sensor" according to the technology of the present disclosure. The photoelectric sensor 50B detects light emitted from an infrared light source 58 provided in the device main body 11 and reflected by the movable portion 21. Accordingly, the photoelectric sensor 50B can detect a distance t3 between the movable portion 21 and the device main body 11 (hereinafter, also simply referred to as a "distance t3") by a so-called time of flight (TOF) system. In the example shown in FIG. 17, an example in which the photoelectric sensor 50B detects the distance t3 in a case where the spacing ensuring unit 20 is in the storage state is illustrated. The photoelectric sensor 50B outputs a signal corresponding to the detected distance t3 to the control device 36. The photoelectric sensor 50B detects the distance t3 in a case where the spacing ensuring unit 20 is in the unfolded state. As described above, in a case where the spacing ensuring unit 20 is in the unfolded state and the storage state, the photoelectric sensor 50B detects the distance t3 in each state.

In the processor 38 (see FIG. 5) of the control device 36, the detection unit 38B (see FIG. 5) detects the state of the spacing ensuring unit 20 according to an output from the photoelectric sensor 50B. Then, the controller 38C (see FIG. 5) executes various controls depending on the state of the spacing ensuring unit 20 detected by the detection unit 38B.

As described above, in the radiation irradiation device 10 according to the fifth modification example, the photoelectric sensor 50B is provided in the device main body 11, and the distance t3 between the movable portion 21 of the spacing ensuring unit 20 and the device main body 11 is detected by the photoelectric sensor 50B. A distance between the movable portion 21 and the device main body 11 changes between the storage state and the unfolded state. In the present configuration, the state of the spacing ensuring unit 20 is detected according to the output from the photoelectric sensor 50B. Accordingly, a need for the user to perform work according to the state of the spacing ensuring unit 20 is reduced, and the convenience of the radiation irradiation device 10 is improved.

In addition, for example, in a case where the detection sensor 50 is provided in the device main body 11, it is possible to suppress complexity of a structure of the spacing ensuring unit 20 as compared with a case where the detection sensor 50 is provided in the spacing ensuring unit 20.

Further, in the fifth modification example, although an example of a form in which the detection sensor 50 is the photoelectric sensor 50B has been described, this is merely an example. The detection sensor 50 may be any sensor that can detect the distance t3. For example, a magnetic force sensor may be used as the detection sensor 50. In this case, for example, a magnetic body may be provided in the movable portion 21 and the distance t3 may be detected by the magnetic force sensor detecting a change in magnetic field by the magnetic body as the movable portion 21 is displaced.

Sixth Modification Example

In the first embodiment, although an example of a form in which the state of the spacing ensuring unit 20 is detected by the detection sensor 50 has been described, the technology of the present disclosure is not limited thereto. In the sixth modification example, the optical image 47A is obtained by imaging the movable portion with the optical camera 47, and the state of the spacing ensuring unit 20 is detected through image recognition processing on the optical image 47A.

Figure 18:
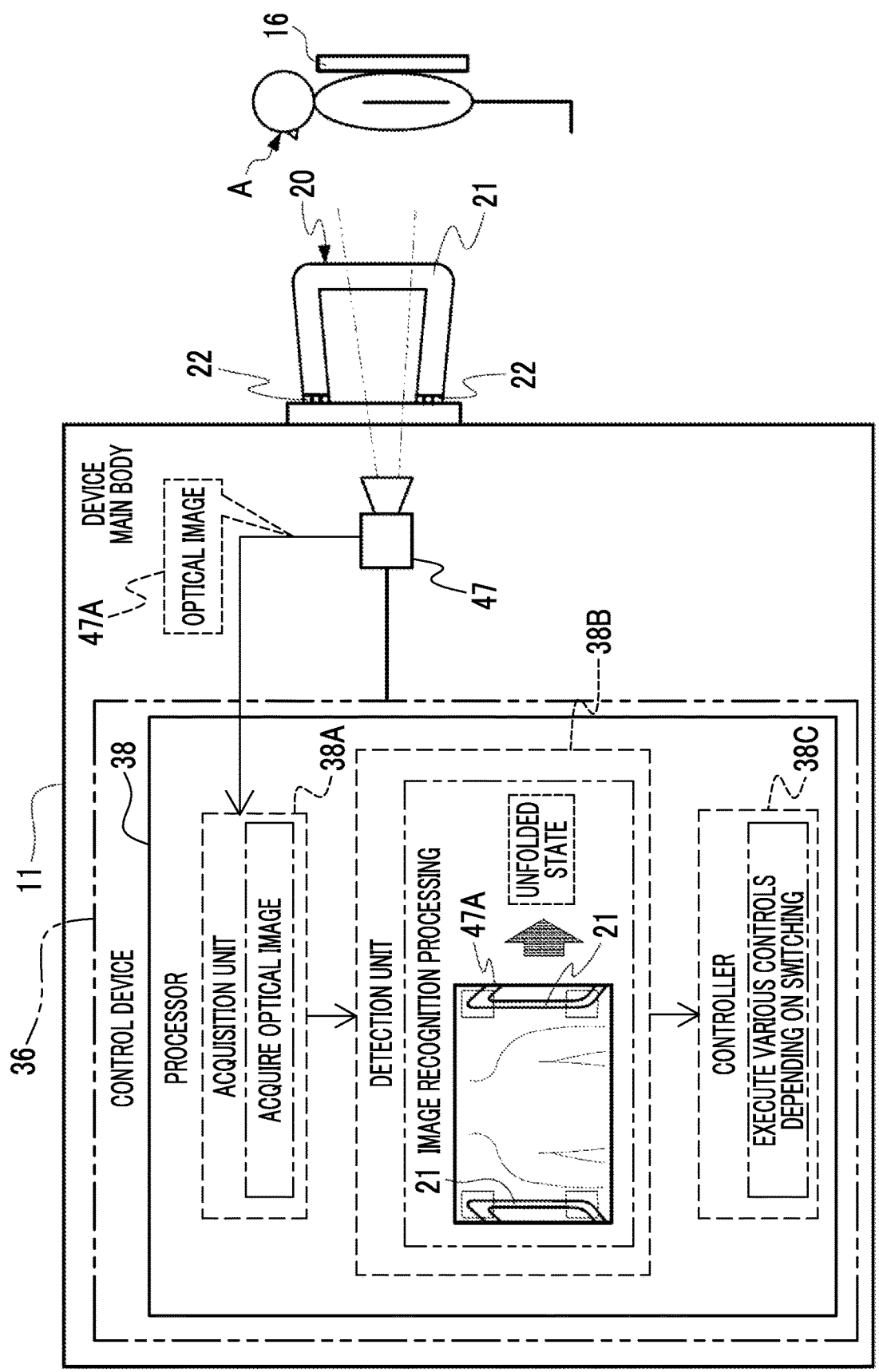
FIG. 18 is a conceptual diagram showing an example of contents of processing of the acquisition unit, the detection unit, and the controller.

As shown in FIG. 18 as an example, the optical image 47A is obtained by the optical camera 47. In a case where imaging is performed by the optical camera 47 in a state in which the spacing ensuring unit 20 is in the unfolded state, the optical image 47A includes an image showing the movable portion 21. The acquisition unit 38A acquires the optical image 47A from the optical camera 47. Then, the acquisition unit 38A outputs the optical image 47A to the detection unit 38B. Here, the optical image 47A includes a moving image captured in accordance with an imaging start instruction and a live view moving image before the imaging start instruction is input.

The detection unit 38B executes image recognition processing on the optical image 47A acquired from the acquisition unit 38A. As a result of the image recognition processing, a state of the spacing ensuring unit 20 is detected. In the example shown in FIG. 18, a corner portion of the movable portion 21 is extracted by the image recognition processing, and it is detected that the spacing ensuring unit 20 is in the unfolded state. The image recognition processing is not particularly limited, and examples thereof include image recognition processing by an artificial intelligence (AI) system and/or a pattern matching system. Then, the controller 38C executes various controls according to the state of the spacing ensuring unit 20 detected by the detection unit 38B.

As described above, in the radiation irradiation device 10 according to the sixth modification example, the image recognition processing is performed on the optical image 47A in which the movable portion 21 of the spacing ensuring unit 20 is imaged, so that the state of the spacing ensuring unit 20 is detected. Accordingly, a need for the user to perform work according to the state of the spacing ensuring unit 20 is reduced, and the convenience of the radiation irradiation device 10 is improved.

In addition, for example, the optical camera 47 images the subject A, and the optical image 47A obtained by the optical camera 47 is used in registration for preparation for the irradiation with the radiation. In the present configuration, the image recognition processing is executed on the optical image 47A, so that the state of the spacing ensuring unit 20 is detected. Thus, simplification of a configuration of the radiation irradiation device 10 is realized as compared with a case where an optical camera for the image recognition processing is separately provided.

Further, in the sixth modification example, an example of a form in which the corner portion of the movable portion 21 is extracted by the image recognition processing has been described, but this is merely an example. For example, the entire movable portion 21 may be extracted, or an aspect in which a marker provided in the movable portion 21 (for example, a cross mark indicated in the movable portion 21) is detected may be employed. In addition, depending on an arrangement of the unfolded state of the movable portion 21, in a case where the movable portion 21 is not detected by the image recognition processing (for example, there is no reflection of the movable portion in the optical image 47A), an aspect in which the detection unit 38B detects that the spacing ensuring unit 20 is in the unfolded state may be employed. Further, as a matter of course, the image recognition processing may be performed to detect that the spacing ensuring unit 20 is in the storage state.

The methods of detecting the state of the spacing ensuring unit 20 described in the first embodiment, the fifth modification example, and the sixth modification example may be used in combination. For example, an aspect in which both the detection of the state by the detection sensor 50 provided in the hinge 22 and the detection of the state by the image recognition processing on the optical image 47A obtained by the optical camera 47 are performed may be employed.

In the above embodiment, although an example of a form in which the inner wall surface 34 faces all surfaces other than the back surface 12B of the remote operation unit 12 in a state in which the remote operation unit 12 is accommodated in the accommodation portion 24 has been described, the technology of the present disclosure is not limited thereto. For example, an aspect in which the operation surface 12A of the remote operation unit 12 is exposed in a state in which the remote operation unit 12 is accommodated in the accommodation portion 24 may be employed. In addition, an aspect in which a plurality of surfaces of the remote operation unit 12 are exposed in a state in which the remote operation unit 12 is accommodated in the accommodation portion 24 may be employed. That is, an aspect in which the accommodation portion 24 is formed by cutting out a corner portion of the device main body 11 and the remote operation unit 12 is attached to the accommodation portion 24 via two surfaces of the remote operation unit 12 may be employed.

Further, as long as the remote operation unit 12 is attachable to and detachable from the device main body 11, the technology of the present disclosure is established. For example, an aspect in which the remote operation unit 12 is attached to an outer peripheral surface of the device main body 11 via one surface of the remote operation unit 12 or an aspect in which a part of the remote operation unit 12 is hooked on a hook provided on the device main body 11 may be employed.

In the above embodiment, an example of a form in which the remote operation unit 12 and the device main body 11 perform wireless communication has been described, but the technology of the present disclosure is not limited thereto. The remote operation unit 12 and the device main body 11 may perform wired communication.

Further, in the above embodiment, an example of a form in which a shape of the movable portion 21 of the spacing ensuring unit 20 is a flat plate, but the technology of the present disclosure is not limited thereto. The shape of the movable portion 21 may be a solid or hollow round bar. Further, although an example of a form in which the shape of the movable portion 21 is a U-shape in a side view has been described, this is merely an example. The movable portion 21 may be a rectangular plate-like member, or may have a shape in which a plurality of rod-like members are extended.

In the above embodiment, although an example of a form in which the movable portion 21 of the spacing ensuring unit 20 is bent or rotated about the hinge 22 has been described, the technology of the present disclosure is not limited thereto. The movable portion 21 may have a form of expanding and contracting along an extension direction.

Moreover, in the above embodiment, an example of a form in which the control program 40A is stored in the storage 40 has been described, but the technology of the present disclosure is not limited thereto. For example, the control program 40A may be stored in a storage medium (not shown), such as an SSD or a universal serial bus (USB) memory. The storage medium is a portable computer-readable non-transitory storage medium. The control program 40A stored in the storage medium is installed in the radiation irradiation device 10. The processor 38 executes processing in accordance with the control program 40A.

Further, the control program 40A may be stored in a storage device of another computer, a server, or the like that is connected to the radiation irradiation device 10 via the network, and the control program 40A may be downloaded according to a request of the radiation irradiation device 10 and may be installed in the radiation irradiation device 10. That is, the program (program product) described in the present embodiment may be provided by the recording medium or in a form of being distributed from an external computer.

Moreover, in the above embodiment, although the processor 38, the storage 40, the RAM 42, and the external I/F 44 of the radiation irradiation device 10 are illustrated as a computer, the technology of the present disclosure is not limited thereto, and instead of the computer, a device including an application specific integrated circuit (ASIC), a field-programmable gate array (FPGA), and/or a programmable logic device (PLD) may be applied. Moreover, a hardware configuration and a software configuration may be used in combination, instead of the computer.

The following various processors can be used as hardware resources for executing the processing described in the above embodiment. Examples of the processor include a CPU which is a general-purpose processor functioning as the hardware resource for executing the processing by executing software, that is, a program. In addition, examples of the processor include a dedicated electric circuit which is a processor having a circuit configuration specially designed for executing specific processing, such as an FPGA, a PLD, or an ASIC. A memory is incorporated in or connected to any processor, and any processor uses the memory to execute the processing.

The hardware resource for executing the processing may be configured by one of these various processors, or may be configured by a combination (for example, a combination of a plurality of FPGAs or a combination of a CPU and an FPGA) of two or more processors of the same type or different types. Further, the hardware resource for executing the processing may be one processor.

As an example in which the hardware resource is configured with one processor, first, there is a form in which one processor is configured with a combination of one or more CPUs and software, and the processor functions as the hardware resource for executing the processing. Second, there is a form in which a processor that realizes functions of the entire system including a plurality of hardware resources for executing the processing with one integrated circuit (IC) chip is used, as typified by a system-on-a-chip (SoC). In this way, the processing is realized by using one or more of the various processors described above, as the hardware resource.

As a hardware structure of these various processors, more specifically, it is possible to use an electric circuit in which circuit elements, such as semiconductor elements, are combined. In addition, the image processing is merely an example. Therefore, it is needless to say that unnecessary steps may be deleted, new steps may be added, or a processing order may be changed without departing from the gist.

The above-described contents and illustrated contents are detailed descriptions of parts related to the technology of the present disclosure, and are merely examples of the technology of the present disclosure. For example, the above descriptions related to configurations, functions, operations, and advantageous effects are descriptions related to examples of configurations, functions, operations, and advantageous effects of the parts related to the technology of the present disclosure. Therefore, it is needless to say that unnecessary parts may be deleted, or new elements may be added or replaced with respect to the above-described contents and illustrated contents within a scope not departing from the spirit of the technology of the present disclosure. In order to avoid complication and easily understand the parts according to the technology of the present disclosure, in the above-described contents and illustrated contents, common technical knowledge and the like that do not need to be described to implement the technology of the present disclosure are not described.

All documents, patent applications, and technical standards described in the present specification are incorporated in the present specification by reference to the same extent as in a case where each document, patent application, and technical standard are specifically and individually noted to be incorporated by reference.

Furthermore, the following appendices will be disclosed in relation to the above-described embodiment.

Appendix 1

A radiation irradiation device comprising: a device main body that irradiates a subject with radiation; a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion; and a processor, in which the processor is configured to: detect a state including the storage state and the unfolded state of the spacing ensuring unit; and execute a control of an operation of the device main body according to the detected state.

Appendix 2

The radiation irradiation device according to Appendix 1, in which in a case where an irradiation start instruction which is an instruction to start irradiation with the radiation is input, the processor executes, as the control, an irradiation control which is a control related to the irradiation.

Appendix 3

The radiation irradiation device according to Appendix 2, in which the irradiation control includes prohibiting the irradiation with the radiation by the device main body or notifying whether or not the irradiation with the radiation is allowed in a case where the spacing ensuring unit is in the storage state.

Appendix 4

The radiation irradiation device according to Appendix 2, in which the irradiation control includes permitting the irradiation with the radiation by the device main body in a case where the spacing ensuring unit is in the unfolded state.

Appendix 5

The radiation irradiation device according to any one of Appendices 1 to 4, in which the control includes starting preparation for irradiation with the radiation in a case where the spacing ensuring unit is brought into the unfolded state.

Appendix 6

The radiation irradiation device according to any one of Appendices 1 to 5, in which the control includes releasing at least a part of functions of the device main body, which are stopped in the storage state, in a case where the spacing ensuring unit is brought into the unfolded state.

Appendix 7

The radiation irradiation device according to Appendix 6, in which the functions of the device main body, which are stopped in the storage state, include a function of performing irradiation with the radiation, and the function of performing irradiation with the radiation remains stopped while an additional operation is not performed even in a case where the spacing ensuring unit is brought into the unfolded state.

Appendix 8

The radiation irradiation device according to any one of Appendices 1 to 7, in which the device main body includes a notification unit that gives a notification to a user, and the control includes causing the notification unit to give a notification regarding the state.

Appendix 9

The radiation irradiation device according to any one of Appendices 1 to 8, in which in a case where a power supply of the device main body is turned off, the power supply of the device main body is turned on in a case where the spacing ensuring unit is brought into the unfolded state.

Appendix 10

The radiation irradiation device according to any one of Appendices 1 to 9, in which the device main body is provided with a first sensor capable of detecting a distance between the movable portion and the device main body in each of the storage state and the unfolded state, and the processor detects the state of the spacing ensuring unit according to an output from the first sensor.

Appendix 11

The radiation irradiation device according to any one of Appendices 1 to 9, in which the spacing ensuring unit is provided with a second sensor capable of detecting a displacement of the movable portion, and the processor detects the state of the spacing ensuring unit according to an output from the second sensor.

Appendix 12

The radiation irradiation device according to any one of Appendices 1 to 9, in which the device main body includes an optical imaging device capable of imaging the subject, and the processor detects the state of the spacing ensuring unit by executing image recognition processing on an image obtained by imaging the movable portion with the optical imaging device.

What is claimed is:
1. A radiation irradiation device comprising:
a device main body that irradiates a subject with radiation;
a spacing ensuring unit that is a member extending from the device main body in an emission direction of the radiation to ensure a spacing between the subject and the device main body and is switchable between an unfolded state in which a length extending from the device main body is a predetermined length and a storage state in which a length from the device main body is shorter than the predetermined length with a displacement of at least a part of a movable portion; and
a processor that is configured to:
  detect a state including the storage state and the unfolded state of the spacing ensuring unit; and
  execute a control of an operation of the device main body according to the detected state,
wherein the device main body includes an optical imaging device capable of imaging the subject, and
the processor detects the state of the spacing ensuring unit by executing image recognition processing on an image obtained by imaging the movable portion with the optical imaging device.

2. The radiation irradiation device according to claim 1, wherein in a case where an irradiation start instruction which is an instruction to start irradiation with the radiation is input, the processor executes, as the control, an irradiation control which is a control related to the irradiation.

3. The radiation irradiation device according to claim 2, wherein the irradiation control includes prohibiting the irradiation with the radiation by the device main body or notifying whether or not the irradiation with the radiation is allowed in a case where the spacing ensuring unit is in the storage state.

4. The radiation irradiation device according to claim 2, wherein the irradiation control includes permitting the irradiation with the radiation by the device main body in a case where the spacing ensuring unit is in the unfolded state.

5. The radiation irradiation device according to claim 1, wherein the control includes starting preparation for irradiation with the radiation in a case where the spacing ensuring unit is brought into the unfolded state.

6. The radiation irradiation device according to claim 1, wherein the control includes releasing at least a part of functions of the device main body, which are stopped in the storage state, in a case where the spacing ensuring unit is brought into the unfolded state.

7. The radiation irradiation device according to claim 6, wherein the functions of the device main body, which are stopped in the storage state, include a function of performing irradiation with the radiation, and
the function of performing irradiation with the radiation remains stopped while an additional operation is not performed even in a case where the spacing ensuring unit is brought into the unfolded state.

8. The radiation irradiation device according to claim 1, wherein the device main body includes a notification unit that gives a notification to a user, and
the control includes causing the notification unit to give a notification regarding the state.

9. The radiation irradiation device according to claim 1, wherein in a case where a power supply of the device main body is turned off, the power supply of the device main body is turned on in a case where the spacing ensuring unit is brought into the unfolded state.

* * * * *